(12) United States Patent
Hillyerd

(10) Patent No.: US 12,737,013 B2
(45) Date of Patent: Sep. 15, 2026

(54) COMPUTING DEVICE HINGES

(71) Applicant: Microsoft Technology Licensing, LLC, Redmond, WA (US)

(72) Inventor: Anthony E. Hillyerd, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 17/793,624

(22) PCT Filed: Jan. 17, 2020

(86) PCT No.: PCT/US2020/014025

§ 371 (c)(1),
(2) Date: Jul. 18, 2022

(87) PCT Pub. No.: WO2021/145886

PCT Pub. Date: Jul. 22, 2021

(65) Prior Publication Data

US 2023/0049295 A1 Feb. 16, 2023

(51) Int. Cl.
*G06F 1/16* (2006.01)
*F16C 11/04* (2006.01)
(Continued)

(52) U.S. Cl.
CPC .......... *G06F 1/1681* (2013.01); *F16C 11/045* (2013.01); *F16M 11/10* (2013.01);
(Continued)

(58) Field of Classification Search
CPC .... G06F 1/1681; G06F 1/1679; G06F 1/1637; G06F 1/1616; F16C 11/045; F16M 11/10;
(Continued)

(56) References Cited

U.S. PATENT DOCUMENTS 5,489,924 A 2/1996 Shima
5,564,163 A 10/1996 Lowry et al.
(Continued)

FOREIGN PATENT DOCUMENTS

CN 201301889 Y 9/2009
CN 101672322 A 3/2010
(Continued)

OTHER PUBLICATIONS

Office Action Received for Chinese Application No. 202080092254.4, mailed on Dec. 11, 2023, 11 pages (English Translation Provided).

(Continued)

*Primary Examiner* — Allen L Parker
*Assistant Examiner* — Keon Kim
(74) *Attorney, Agent, or Firm* — Ray Quinney & Nebeker P.C.; John O. Carpenter

(57) ABSTRACT

A hinge of a computing device includes a primary support connecting a display to a stand. As the display rotates about the stand, the primary support slides along a friction strip, which stabilizes the display with respect to the stand. A stabilizer may connect the stand to the base or the stand to the display.

18 Claims, 12 Drawing Sheets

(51) Int. Cl.
*F16M 11/10* (2006.01)
*F16M 11/20* (2006.01)
*F16M 11/38* (2006.01)
*E05D 11/08* (2006.01)

(52) U.S. Cl.
CPC ......... *F16M 11/2021* (2013.01); *F16M 11/38* (2013.01); *G06F 1/1679* (2013.01); *E05D 11/08* (2013.01); *E05Y 2999/00* (2024.05)

(58) Field of Classification Search
CPC .... F16M 11/2021; F16M 11/38; E05D 11/08; E05Y 2999/00
See application file for complete search history.

(56) References Cited

U.S. PATENT DOCUMENTS 5,644,469 A 7/1997 Shioya
6,266,236 B1 7/2001 Ku et al.
6,464,195 B1 10/2002 Hildebrandt
6,826,043 B2 11/2004 Chang
7,061,753 B2 6/2006 Michoux
7,403,378 B2 7/2008 Lo et al.
7,478,786 B2 1/2009 Copeland
7,742,285 B2 6/2010 Ishikura
8,074,323 B2 12/2011 Lin
8,253,648 B2 8/2012 Nagai
8,908,364 B2 12/2014 Tseng et al.
8,914,946 B2 12/2014 Hsu et al.
9,107,301 B2 8/2015 Pan
9,261,906 B2 2/2016 Arima
9,291,299 B2 3/2016 Richard
9,405,325 B2 8/2016 Kim
9,523,226 B1 12/2016 Lam et al.
9,557,778 B2 1/2017 Sung
9,644,412 B2 5/2017 Novin
9,791,674 B1* 10/2017 Topliss ................. G02B 13/009
9,927,844 B2 3/2018 Park
10,025,348 B2 7/2018 Arima
10,061,360 B1 8/2018 Magi et al.
10,151,128 B2 12/2018 Hatano
10,324,501 B1 6/2019 Zimmerman et al.
10,407,957 B1 9/2019 Camp et al.
10,474,203 B2 11/2019 Tazbaz et al.
10,558,245 B2 2/2020 Morrison et al.
10,648,212 B2 5/2020 Novin
10,761,571 B1 9/2020 Cooper
10,852,765 B2 12/2020 Sanchez
10,996,710 B2 5/2021 Park
11,008,789 B2 5/2021 Hatano
11,106,249 B1 8/2021 Zimmerman
11,237,643 B2 2/2022 Kulkarni
11,507,145 B2 11/2022 Nakamura
11,573,611 B2 2/2023 Channaiah
2004/0021051 A1 2/2004 Chiu
2005/0138775 A1 6/2005 Oakley
2006/0211457 A1 9/2006 Otsuka
2006/0288258 A1 12/2006 Lo
2007/0058329 A1 3/2007 Ledbetter
2007/0183123 A1 8/2007 Chuan
2008/0094792 A1 4/2008 Chen
2008/0271288 A1 11/2008 Senatori
2011/0312392 A1* 12/2011 Reeves ............... H04M 1/0216 455/575.3
2012/0124775 A1 5/2012 Ceci
2013/0160244 A1* 6/2013 Sayama ................ G06F 1/1681 16/370
2013/0318746 A1 12/2013 Kuramochi
2014/0026368 A1* 1/2014 Katsuta ............... H04M 1/0237 16/362
2014/0043736 A1* 2/2014 Onda .................. F16M 11/048 361/679.01
2014/0157546 A1 6/2014 Ho et al.
2014/0165334 A1 6/2014 Liu
2014/0338483 A1 11/2014 Hsu et al.
2014/0375194 A1 12/2014 Arima
2014/0375196 A1* 12/2014 Nguyen ................ E05D 15/507 29/592
2015/0002998 A1 1/2015 Arima
2015/0077915 A1 3/2015 Saito
2015/0121654 A1 5/2015 Novin
2015/0185786 A1 7/2015 Yeh et al.
2016/0147267 A1 5/2016 Bitz et al.
2017/0097657 A1 4/2017 Hampton et al.
2017/0208703 A1 7/2017 Lin
2017/0218672 A1 8/2017 Novin
2018/0044958 A1 2/2018 Tazbaz et al.
2018/0059735 A1 3/2018 Tazbaz et al.
2018/0066465 A1 3/2018 Tazbaz et al.
2018/0088634 A1 3/2018 Bitz
2018/0112447 A1 4/2018 Hatano
2018/0188781 A1* 7/2018 Park, Jr. ................ G06F 1/1679
2018/0209473 A1 7/2018 Park et al.
2019/0011957 A1 1/2019 Wendt
2019/0029135 A1 1/2019 Park et al.
2019/0064886 A1 2/2019 Wendt
2019/0243426 A1 8/2019 Morrison et al.
2020/0040626 A1 2/2020 Hatano
2020/0233459 A1 7/2020 Sanchez
2021/0289644 A1 9/2021 Zarnowitz
2022/0057844 A1 2/2022 Nakamura
2023/0034612 A1 2/2023 Hillyerd
2023/0049811 A1 2/2023 Krahn
2023/0084038 A1 3/2023 Yee et al.
2023/0123520 A1 4/2023 Yee et al.
2023/0129909 A1 4/2023 Yee et al.
2024/0111330 A1 4/2024 Yu
2024/0111339 A1 4/2024 Sun

FOREIGN PATENT DOCUMENTS

CN 102572029 A 7/2012
CN 103291163 A 9/2013
CN 103576772 A 2/2014
CN 104765412 A 7/2015
CN 104767843 A 7/2015
CN 204553526 U 8/2015
CN 107771308 A 3/2018
CN 109564449 A 4/2019
CN 109643144 A 4/2019
CN 110168470 A 8/2019
CN 110226149 A 9/2019
CN 108691470 A 9/2021
EP 2397929 A1 12/2011
EP 2557473 A1 2/2013
EP 2615331 A1 7/2013
EP 2696255 A2 2/2014
EP 2911030 A2 8/2015
EP 3069208 A1 9/2016
GB 931284 A 7/1963
WO 2010015931 A2 2/2010
WO 2019099171 A2 5/2019

OTHER PUBLICATIONS

Office Action received for Chinese Application No. 202080092255.9, mailed on Dec. 1, 2023, 16 Pages (English Translation Provided).
Office Action Received for Chinese Application No. 202080093593.4, mailed on Dec. 28, 2023, 11 pages.
Communication pursuant to Article 94(3) EPC, Received for European Application No. 20720607.9, mailed on Jul. 5, 2024, 8 pages.
Communication under Rule 71(3) received in European Application No. 20719884.7, mailed on Jun. 18, 2024, 8 pages.
Second Office Action Received for Chinese Application No. 202080092255.9, mailed on May 23, 2024, 11 pages. (English Translation Provided).
"International Search Report and Written Opinion Issued in PCT Application No. PCT/US20/014025", Mailed Date: Oct. 9, 2020, 14 Pages.
"International Search Report and Written Opinion Issued in PCT Application No. PCT/US20/024692", Mailed Date: Dec. 11, 2020, 15 Pages.

(56) References Cited

OTHER PUBLICATIONS

"International Search Report and Written Opinion Issued in PCT Application No. PCT/US20/024700", Mailed Date: Nov. 23, 2020, 12 Pages.
"International Search Report and Written Opinion Issued in PCT Application No. PCT/US20/040030", Mailed Date: Oct. 9, 2020, 13 Pages.
"International Search Report and Written Opinion Issued in PCT Application No. PCT/US20/040031", Mailed Date: Dec. 2, 2020, 17 Pages.
"Invitation To Pay Additional Fees Issued in PCT Application No. PCT/US20/040031", Mailed Date: Oct. 7, 2020, 10 Pages.
First Office Action Received for Chinese Application No. 202080099087.6, mailed on Aug. 17, 2024, 17 pages (English Translation Provided).
Non-Final Office Action mailed on Sep. 28, 2024, in U.S. Appl. No. 17/790,914, 09 pages.
Non-Final Office Action mailed on Aug. 27, 2024, in U.S. Appl. No. 17/790,926, 9 pages.
Office Action Received for Chinese Application No. 202080092254.4, mailed on Aug. 29, 2024, 9 pages. (English Translation Provided).
U.S. Appl. No. 17/790,914, filed Jul. 5, 2022.
U.S. Appl. No. 17/914,640, filed Sep. 26, 2022.
U.S. Appl. No. 17/790,926, filed Jul. 5, 2022.
U.S. Appl. No. 17/914,684, filed Sep. 26, 2022.
Communication pursuant to Article 94(3) Received in European Patent Application No. 20743462.2, mailed on Dec. 10, 2024, 5 pages.
Non-Final Office Action mailed on Dec. 11, 2024, in U.S. Appl. No. 17/914,684, 10 pages.
Office Action Received for Chinese Application No. 202080099092.7, mailed on Nov. 21, 2024, 15 Pages (English Translation Provided).
Communication pursuant to Article 94(3) Received in European Patent Application No. 20743461.4, mailed on Jan. 16, 2025, 8 pages.
Decision on Rejection Received for Chinese Application No. 202080092255.9, mailed on Jan. 13, 2025, 8 pages (English Translation Provided).
Decision to Grant pursuant to Article 97(1) Received for European Application No. 20719884.7, mailed on Oct. 24, 2024, 02 pages.
Final office action mailed on Jan. 16, 2025, in U.S. Appl. No. 17/790,914, 15 pages.
Notice of grant Received for Chinese Application No. 202080093593.4, mailed on May 10, 2024, 4 pages.
Notice of Grant Received for Chinese Application No. 202080099087.6, mailed on Feb. 8, 2025, 9 pages (English Translation Provided).
Communication Under Rule 71(3) EPC, Received in European Patent Application No. 20743462.2, mailed on May 14, 2025, 08 pages.
Examination report Received for Indian Application No. 202247046431, mailed on Jun. 2, 2025, 7 pages.
Final Office Action mailed on Apr. 14, 2025, in U.S. Appl. No. 17/914,684, 11 pages.
Final Office Action mailed on Mar. 13, 2025, in U.S. Appl. No. 17/790,926, 8 pages.
Notice of Allowance mailed on Apr. 29, 2025, in U.S. Appl. No. 17/790,914, 10 pages.
Second Office Action Received for Chinese Application No. 202080099092.7, mailed on May 16, 2025, 15 Pages (English Translation Provided).
Decision on Rejection Received for Chinese Application No. 202080099092.7, mailed on Sep. 8, 2025, 07 Pages (English Translation Provided).
Decision to grant a European patent pursuant to Article 97(1) EPC, Received in European Patent Application No. 20743462.2, mailed on Jul. 31, 2025, 03 pages.
Decision to Grant pursuant to Article 97(1) received in European Application No. 20707880.9, mailed on Jul. 3, 2025, 2 pages.
Non-Final Office Action mailed on Aug. 22, 2025, in U.S. Appl. No. 17/914,684, 10 Pages.
Non-Final Office Action mailed on Jul. 22, 2025, in U.S. Appl. No. 17/790,926, 17 pages.
Non-Final Office Action mailed on Jun. 26, 2025 in U.S. Appl. No. 17/914,640, 13 pages.
Notice of Allowance mailed on Aug. 26, 2025, in U.S. Appl. No. 17/790,914, 10 pages.
Communication under Rule 71(3) Received in European Patent Application No. 19707672.2, mailed on Mar. 24, 2025, 05 pages.
Decision to grant 97(1) received in European Application No. 19707672.2, mailed on Aug. 7, 2025, 2 Pages.
Notice of Allowance mailed on Jan. 7, 2026, in U.S. Appl. No. 17/914,684, 09 pages.
Notice of Allowance mailed on Nov. 19, 2025, in U.S. Appl. No. 17/790,926, 12 pages.
Office Action Issued in European Patent Application No. 19707672.2 mailed on Jan. 4, 2023.
First Examination report Received for Indian Application No. 202247041584, mailed on Jun. 11, 2026, 07 pages.
U.S. Appl. No. 17/790,926 filed 2022-07-05.

* cited by examiner

COMPUTING DEVICE HINGES

CROSS-REFERENCE TO RELATED APPLICATIONS

N/A.

BACKGROUND

Background and Relevant Art

A computing device may include a touch-screen display and/or one or more input devices, such as a keyboard or a track pad. Computing devices are often used in many locations. To facilitate their use, computing devices may fold for ease of transportation and open up during use. In some situations, opening a mobile computing device for use may increase the footprint of the mobile computing device, or the opened mobile computing device may be inconvenient for a user to operate.

BRIEF SUMMARY

It is beneficial to have a computing device that can transition between different operating postures to facilitate use in various situations. For example, a disclosed computing device may operate in a laptop posture, a studio posture, or an intermediate (airplane) posture, and seamlessly transitions between those postures. As described herein, such a computing device may employ a plurality of hinges to provide the desired operability and transitions.

In some embodiments, a computing device includes a first hinge rotatably connecting a stand to a base. The first hinge has a first coefficient of friction sufficient to maintain a first angular position between the stand and the base. A second hinge rotatably connects the stand to a display. The second hinge has a second coefficient of friction sufficient to maintain a second angular position between the display and the stand.

In some embodiments, a hinge includes a primary support with a primary support first end and a primary support second end. The primary support first end is rotationally connected to a display and the primary support second end is slidably connected to a stand. A stabilizer is connected to the display in a first configuration and a base in a second configuration.

In some embodiments, a method of operating a hinge includes rotating a display into a first position. The display is rotated into a second position with a display hinge. Rotating the display into the second position includes rotating the display about a stand. The method further includes sliding a primary support along a friction strip on the stand.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 7-1 through 7-4 are side views of a computing device changing from a laptop configuration to a studio configuration, according to at least one embodiment of the present disclosure;

FIG. 8-1 through 8-3 are side views of a computing device changing from a studio configuration to a laptop configuration, according to at least one embodiment of the present disclosure.

DETAILED DESCRIPTION

This disclosure generally relates to devices and methods relating to a display hinge for computing devices. For example, a computing device includes multiple hinges between a display component (e.g., a touchscreen) and a base component (e.g., a keyboard) configured to facilitate transitions between different operating postures, such as between a laptop posture and a studio posture in accordance with some embodiments.

Figure 1:
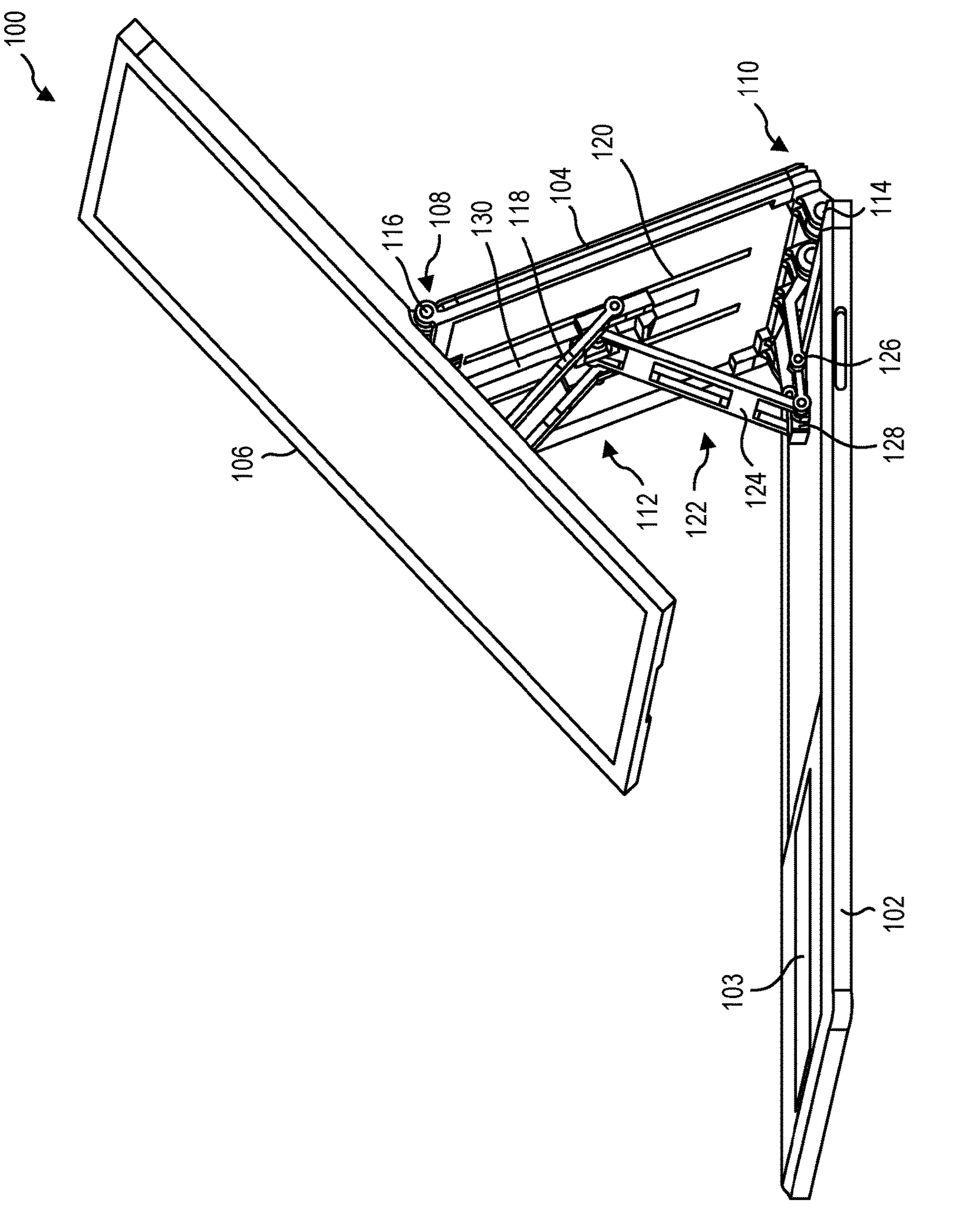
FIG. 1 is a perspective view of a computing device in a studio configuration, according to at least one embodiment of the present disclosure.

FIG. 1 is a representation of a computing device 100, according to at least one embodiment of the present disclosure. The computing device 100 may include a base 102, a stand 104, and a display 106. The base 102 may include one or more input devices 103. The one or more input devices 103 may include a keyboard, a track pad, a track pad button, a mouse, a touch sensitive display, an electronic pen, any other input device 103, or any combination of the foregoing.

The display 106 may include a monitor, an LED/LCD display, a touch sensitive display, or any combination of the foregoing. The display 106 may further include one or more processors and/or computing elements. For example, the display 106 may be a computing device, such as a tablet or a mobile phone. In some embodiments, the display 106 includes an input device, such as a touch sensitive display, a track pad, an electronic pen, a button, a keyboard, any other input device, or any combination of the foregoing.

The stand 104 may rotatably connect the display 106 to the base 102. In this manner, the computing device 100 may change between a plurality of configurations, as will be discussed herein. The stand 104 has a stand first end 108 and a stand second end 110. A base hinge 114 may rotatably connect the stand 104 to the base 102 at the stand second end 110.

In some embodiments, the base hinge 114 is a friction hinge. For example, the base hinge 114 may have a base hinge coefficient of friction sufficient that the base hinge 114 may maintain a stand angle between the stand 104 and the base 102 absent a base torque about the base hinge. The base torque about the base hinge 114 may be the minimum torque required to change the stand angle. The base hinge 114 may be any friction hinge known in the art. For example, the base hinge 114 may include one or more piano hinges having a central pin that extends through a plurality of hinge members with an interference fit such that the hinge members clamp down on the central pin. In other examples, the base hinge 114 may include one or more springs, threaded connections, or other hinge members, connected in such a way to require a base torque applied about the base hinge 114 to rotate the stand 104 relative to the base 102.

A display hinge 112 may rotatably connect the stand 104 to the display 106. In some embodiments, the display hinge 112 is a friction hinge. For example, the elements of the display hinge 112 may have a combined display hinge coefficient of friction. The display hinge coefficient of friction may be sufficient to maintain a display hinge angle between the display 106 and the stand 104 absent a display breakout torque on the display 106. The display breakout torque may be the minimum torque required to rotate the display 106 about the display hinge 112. The display hinge 112 may include a stand hinge 116 between the display 106 and the stand 104. The stand hinge 116 may be any type of hinge. For example, the stand hinge 116 may be a friction hinge similar to the base hinge 114. In other examples, the stand hinge 116 may be a piano hinge that requires a torque to rotate the display 106 with respect to the stand 104. In still other examples, the stand hinge 116 may include one or more strips of fabric or cloth between the stand 104 and the display 106.

The display hinge 112 may include a primary support 118. The primary support 118 may connect the stand 104 to the display 106. In some embodiments, the primary support 118 is rotatably connected to the display 106 at a fixed location (not shown in this view) and to the stand 104 at a primary friction strip 120. As the primary support 118 slides up and down the primary friction strip 120, a display hinge angle between the display 106 and the stand 104 may change.

The display hinge 112 may further include a stabilizer 122. The stabilizer 122 may include an upper member 124 and a lower member 126. The upper member 124 may connect to the lower member 126 at a stabilizer connector 128. In at least one embodiment, the stabilizer connector 128 releasably connects to the base 102. In some embodiments, the stabilizer connector 128 releasably connects to the display 106. In this manner, the stabilizer 122 may stabilize the display 106 and/or the stand 104.

The upper member 124 may connect to the stand 104 along a stabilizer friction strip 130. The upper member 124 may slide along the stabilizer friction strip 130. As the upper member 124 slides along the stabilizer friction strip 130, the stand angle between the stand 104 and the base 102 may change.

By rotating the stand 104 about the base hinge 114 and/or the display 106 about the display hinge 112, the computing device 100 may switch between two or more configurations. For example, in the embodiment shown, the computing device is in a studio configuration. In the studio configuration, the display 106 may be rotated at an angle with respect to the stand 104. For example, the display 106 may be non-parallel to the stand 104. The display 106 may be rotated such that at least a portion of the display is located over at least a portion of the base 102, or overlaps at least a portion of the base 102. In some embodiments, the display 106 contacts or rests against the base 102. In some embodiments, the display 106 does not contact or touch the base 102. In some embodiments, the display 106 is located above or overlaps one or more input device 103. In at least one embodiment, the studio configuration allows a user to selectively adjust the height, overlap, and/or angle of the display 106. In some embodiments, the studio configuration allows the user to operate the computing device in a confined area. This increases the versatility of the computing device, allowing it to be used in more locations and/or situations, such as in transit (e.g., on an airplane) or in locations lacking a traditional desk and office chair.

Figure 2:
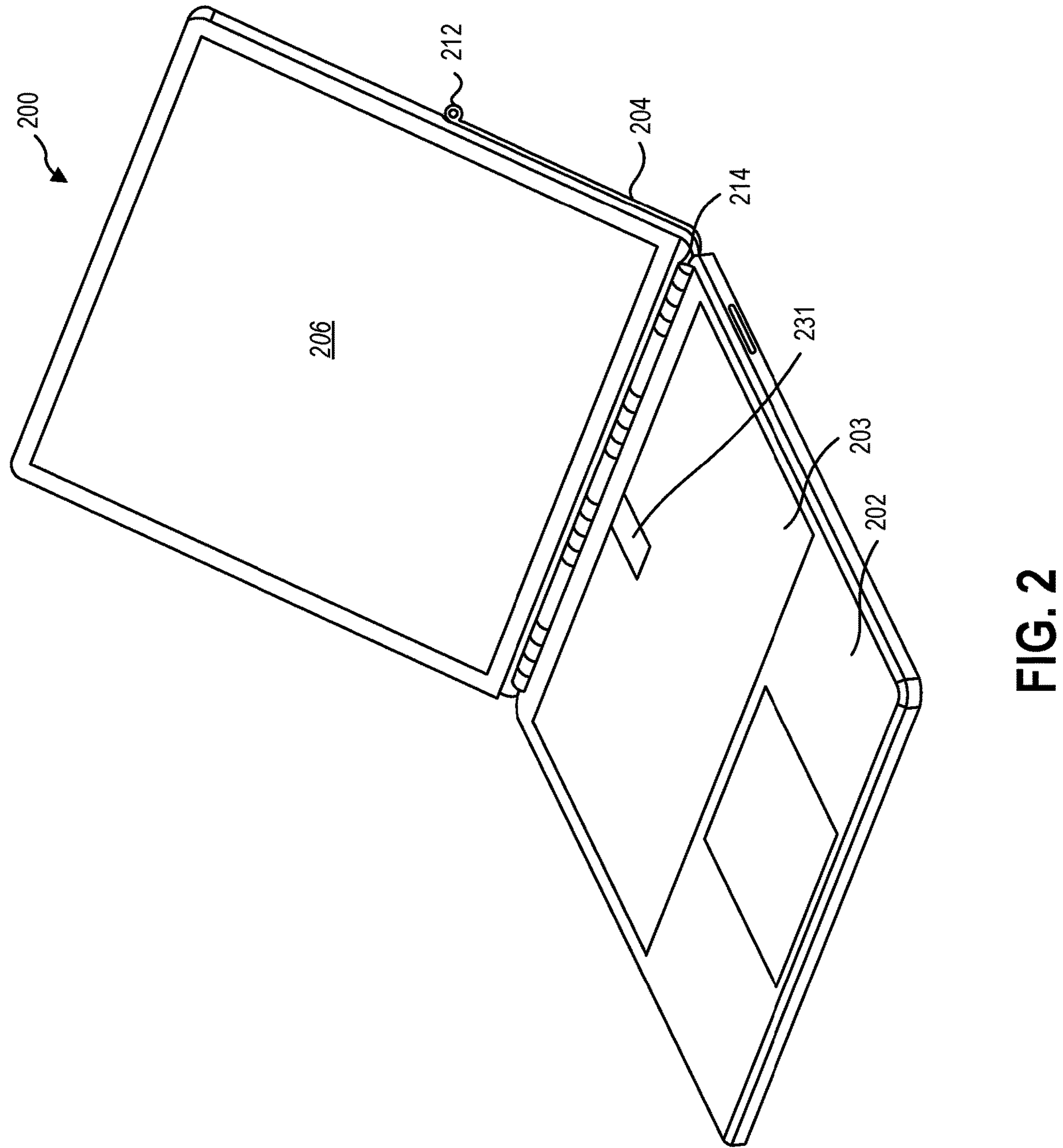
FIG. 2 is a perspective view of a computing device in a laptop configuration, according to at least one embodiment of the present disclosure.

FIG. 2 is a representation of a computing device 200, according to at least one embodiment of the present disclosure. In the embodiment shown, the computing device 200 is in a laptop configuration. In the laptop configuration, a display 206 may be rotated about a display hinge 212 such that the display 206 is parallel to a stand 204. As the stand 204 is rotated about a base hinge 214 with respect to the base 202, the display 206 may be rotated as well. Thus, in the laptop configuration, the computing device 200 may resemble a traditional laptop, in that the display 206 is located at an angle relative to the base, and a majority or an entirety of the base 202 and/or an input device 203 is exposed.

Including both a studio configuration (as seen in FIG. 1) and a laptop configuration increases the versatility of the computing device 200 by providing for use in many situations as noted above.

The base 202 may include a base stabilizer receiver 231. The base stabilizer receiver 231 may be configured to receive or connect to a stabilizer connector (e.g., stabilizer connector 128 of FIG. 1). In this manner, the stand 204 may be stabilized or supported by the stabilizer (e.g., the stabilizer 122 of FIG. 1) when the computing device 200 is in the studio mode (as shown in FIG. 1).

Figure 3:
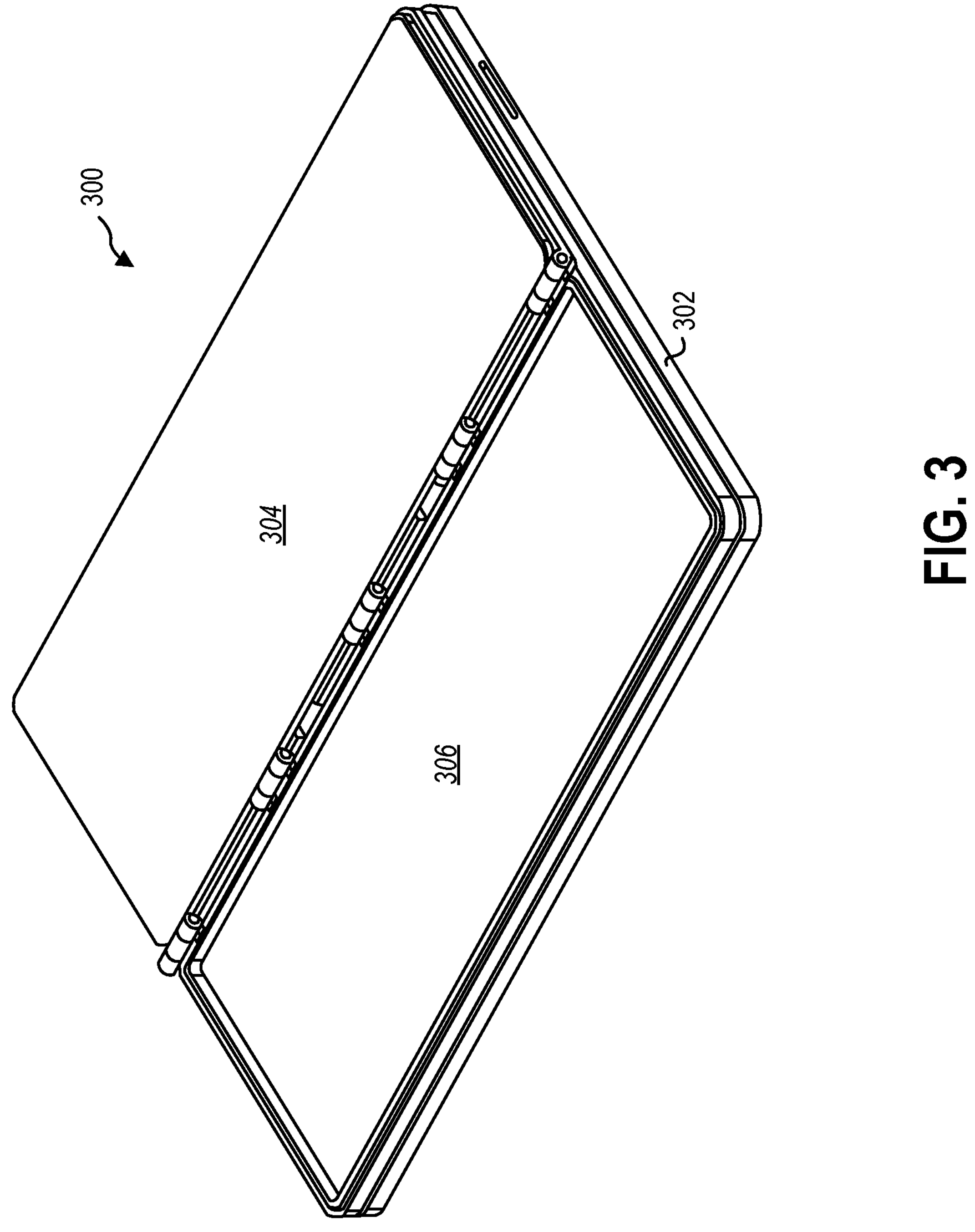
FIG. 3 is a perspective view of a computing device in a closed configuration, according to at least one embodiment of the present disclosure.

FIG. 3 is a representation of a computing device 300, according to at least one embodiment of the present disclosure. In the embodiment shown, the computing device 300 is folded into a closed configuration. In the closed configuration, the display 306 may be parallel or approximately parallel to the stand 304 and the base 302. In this manner, the computing device 300 may occupy a small volume, thereby enabling easy transport and/or storage. The stand 304 may be located on the outside of the computing device, covering at least a portion of the display 306 in the closed configuration. The base 302 may be located on an outside of the computing device, opposite the stand 304. In this manner, the display 306 may be located between the stand 304 and the base 302 in the closed configuration.

Figure 4:
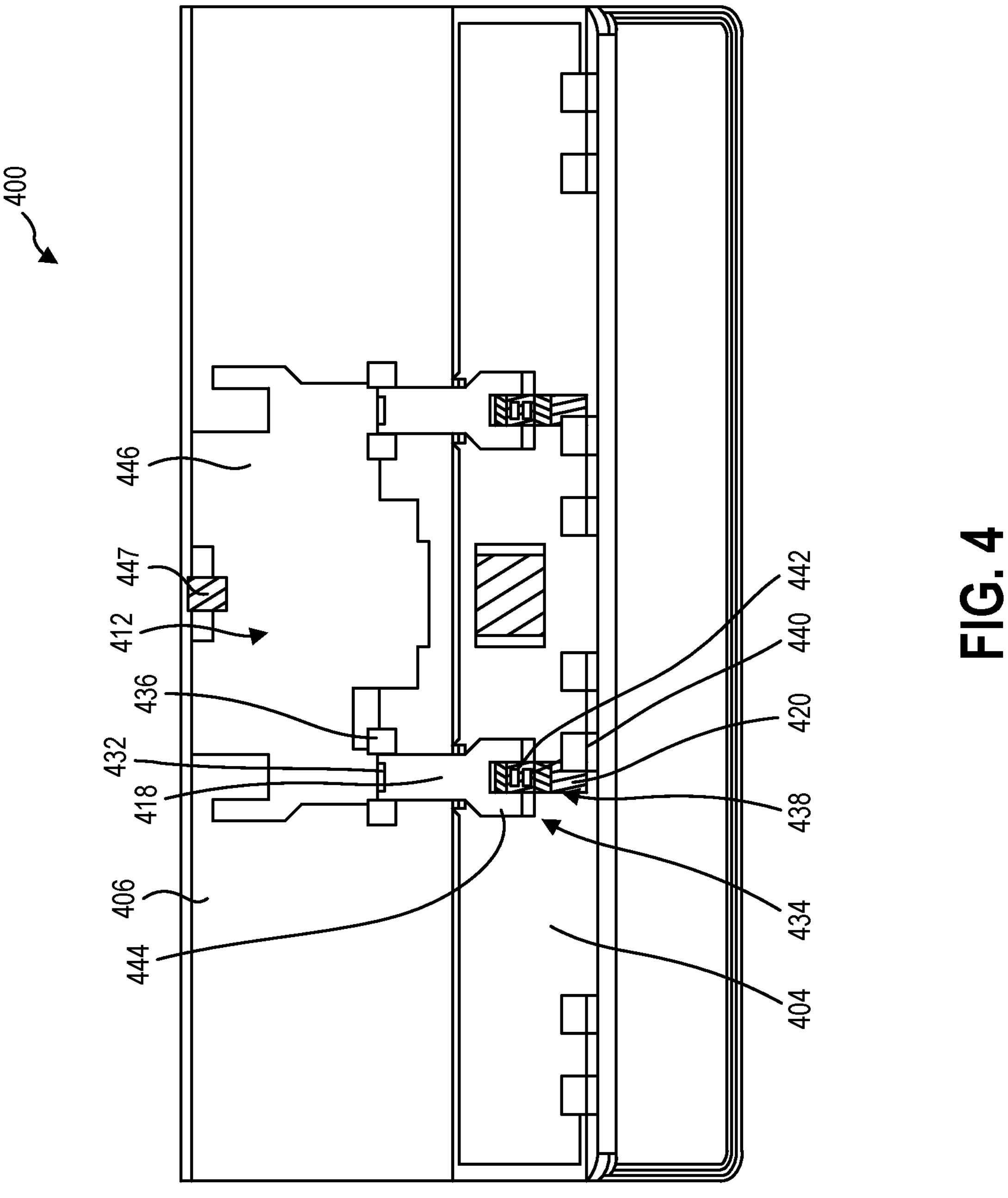
FIG. 4 is a bottom up view of a display and a stand, according to at least one embodiment of the present disclosure.

FIG. 4 is bottom-up view of a representation of a display 406 and a stand 404 of a computing device 400, according to at least one embodiment of the present disclosure. The display 406 may be connected to the stand 404 with a display hinge 412. The display hinge 412 may include one or more primary supports 418.

The primary supports 418 have a primary support first end 432 and a primary support second end 434. The primary support first end 432 may attach to the display 406 at a primary support connection 436. The primary support connection 436 may be a rotational connection such that the primary support 418 may be rotationally connected to the display 406 at the primary support attachment 436. In this manner, the primary support 418 may rotate about the primary support first end 432 at the primary support connection 436. In at least one embodiment, the primary support connection 436 is a fixed connection, meaning that the primary support 418 does not slide with respect to the display 406, although it may rotate with respect to the display 406 about the fixed connection. For example, the primary support 418 may be rotationally, but not slidably, connected to the display 406.

The primary support 418 may be slidably connected to the stand 404 at the primary support second end 434 with a stand connection 438. The stand connection 438 may include a primary friction strip 420 on the stand 404. The primary support 418 may include a friction member 440. The friction member 440 may be slidably connected to the primary friction strip 420. For example, the friction member 440 may slide along the primary friction strip 420. The interface between the friction member 440 and the primary friction strip 420 may have a coefficient of friction. A primary support friction force may be required to slide the friction member 440 along the primary friction strip 420. The interface between the friction member 440 and the primary friction strip 420 may therefore be optimized for a desired primary support friction force. The primary support friction force may be related to the amount of display torque required to rotate the display 406 about the display hinge 412. For example, an increased primary support friction force required to slide the friction member 440 along the primary friction strip 420 may increase the display torque required to rotate the display 406, and a decreased primary support friction force may decrease the display torque required to rotate the display 406.

In at least one embodiment, the primary friction strip 420 is magnetic, and the friction member includes one or more magnets 442. The primary friction strip 420 may have a first magnetic polarity, and the one or more magnets 442 may have a second magnetic polarity. The first magnetic polarity may be opposite from the second magnetic polarity such that the one or more magnets 442 and the primary friction strip 420 are magnetically attracted to each other. The strength of the magnetic attraction between the one or more magnets and the primary friction strip 420, in combination with the coefficient of friction at the interface between the friction member 440 and the primary friction strip 420, may, at least in part, affect the primary support friction force required to slide the friction member 440 along the primary friction strip 420. For example, a greater magnetic attraction between the one or more magnets 442 and the magnetic primary friction strip 420 may increase the primary support friction force. Conversely, a lesser magnetic attraction between the one or more magnets 442 and the magnetic primary friction strip 420 may decrease the primary support friction force.

In some embodiments, a contact area between the primary friction strip 420 and the friction member 440 affects the primary support friction force. For example, a width of the primary friction strip 420 and the friction member 440 may be increased to increase the contact area, which may increase the primary support friction force. In other examples, a length of the friction member 440 may be increased to increase the contact area, which may increase the primary support friction force.

In the embodiment shown, the display hinge 412 includes two primary supports 418, each primary support 418 including its own primary friction strip 420 and friction member 440. In some embodiments, the display hinge 412 includes a single primary support 418 and associated primary friction strip 420 and friction member 440. In yet other examples, the display hinge includes more than two primary supports 418, including three, four, five, six, or more primary supports 418 and associated friction strips 420 and friction members 440. Multiple friction strips 420 and friction members 440 may combine for an effective contact area. The effective contact area may be a sum of the individual contact areas experienced by each primary friction strip 420 and friction member 440. Therefore, by increasing or decreasing the number of primary supports 418, the effective contact area may be increased or decreased. This in turn may increase or decrease the amount of display torque required to rotate the display hinge 412.

A magnetic connection between the friction member 440 and the primary friction strip 420 may improve reliability of the display hinge 412. For example, a magnetic connection may be relatively easy for a user to re-connect if the friction member 440 becomes separated from the primary friction strip 420. In other examples, the magnetic strip and/or the one or more magnets 442 may have a longer effective life, the magnetic attraction between the two remaining substantially the same until the magnetic strip and/or the one or more magnets 442 are worn thin.

In some embodiments, the one or more magnets 442 and/or the magnetic primary friction strip 420 comprises a permanent magnet. For example, the one or more magnets 442 and/or the magnetic primary friction strip 420 may be made from iron-based magnets or magnetic alloys (e.g., ferrite, alnico), rare-earth magnets (e.g., neodymium, samarium-cobalt), minerals (e.g., magnetite, lodestone), any other magnetic material, or any combination of the foregoing. In some embodiments, the one or more magnets 442 and/or the magnetic primary friction strip 420 comprises an electromagnet.

In some embodiments, the friction member 440 and the primary friction strip 420 are non-magnetic. For example, the primary friction strip 420 may be a slot, and the friction member 440 may include a protrusion inserted with an interference fit into the slot. In other examples, the primary friction strip 420 may be a dovetail slot, and the friction member 440 may include a matching dovetail protrusion inserted into the dovetail slot and selectively tightened against the dovetail slot. In still other examples, the friction member 440 may be a band, and the primary friction strip 420 may be a support around which the band is wound and tightened.

The friction member 440 may be rotationally connected to the primary support 418. In this manner, as the friction member 440 slides along the primary friction strip 420, the friction member 440 may maintain full contact with the primary friction strip 420. In some embodiments, the friction member 440 is connected to the primary support 418 with any type of connection. In the embodiment shown, the primary support 418 includes a fork 444 at the primary support second end 434. The friction member 440 may be located between the prongs of the fork 444 with a pinned connection. In some embodiments, the friction member 440 is connected to the primary support with a ball and socket connection, a strip of cloth or fabric, or a pinned connection at the top of the friction member 440.

The display 406 may include one or more indentations 446. The one or more indentations 446 may correspond to elements of the display hinge 412 and/or other elements connected to the stand 404. In this manner, as the stand 404 is rotated toward the display 406, elements of the display hinge 412 and/or other elements connected to the stand 404 may protrude into the one or more corresponding indentations. Therefore, the stand 404 may be rotated to parallel to the display 406 without the elements of the display hinge 412 and/or other elements connected to the stand 404 getting in the way. This may reduce the total width of the computing device 400 when in the laptop configuration (as shown in FIG. 2) and in the closed configuration (as shown in FIG. 3). For example, by including the one or more indentations 446 in the display 406, the stand 404 may be able to lay flat against the display 406.

The display may include a display stabilizer receiver 447. The display stabilizer receiver 447 may be configured to receive or connect to a stabilizer connector (e.g., stabilizer connector 128 of FIG. 1). In this manner, the display 406 may be secured to the stand 404 by the stabilizer (e.g., stabilizer 122 of FIG. 1). This helps the display 406 to remain parallel to the stand 404 in the closed configuration (shown in FIG. 3) and/or the laptop configuration (shown in FIG. 2).

Figure 5:
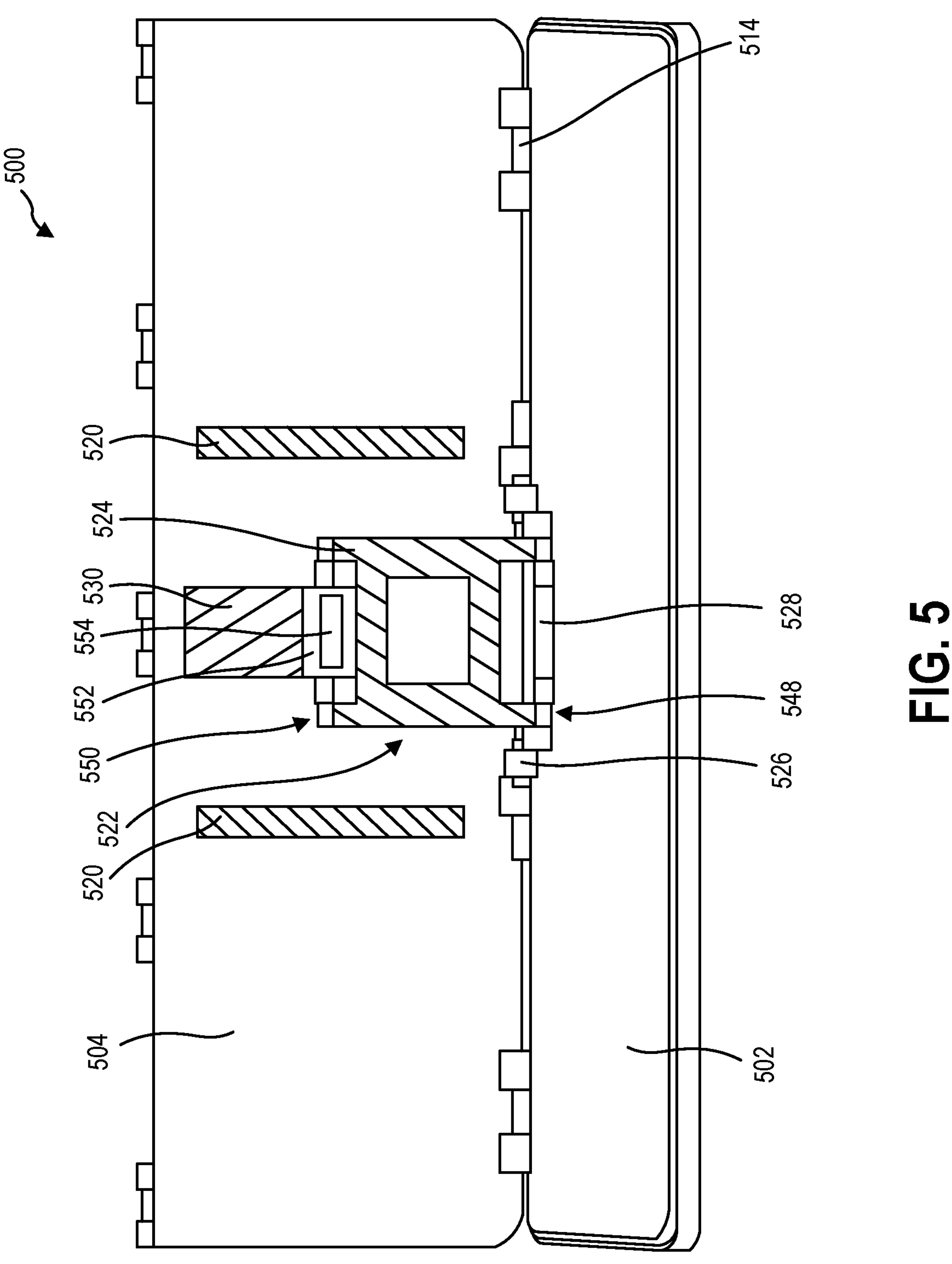
FIG. 5 is a front view of a base and a stand, according to at least one embodiment of the present disclosure.

FIG. 5 is front view of a representation of a stand 504 and a base 502 of a computing device 500, according to at least one embodiment of the present disclosure. The stand 504 may be connected to the base 502 at a base hinge 514. The stand 504 may further be connected to the base 502 with a stabilizer 522. The stabilizer 522 may include an upper member 524 and a lower member 526. The upper member 524 has an upper member first end 548 and an upper member second end 550. The upper member first end 548 may be connected to the lower member 526 at a stabilizer connector 528. The upper member second end 550 may include an upper member friction element 552.

The upper member friction element 552 may be connected to a stabilizer friction strip 530 located on the stand 504. The upper member friction element 552 may be slidably connected to the stabilizer friction strip 530. For example, the upper member friction element 552 may slide along the stabilizer friction strip 530. The interface between the upper member friction element 552 and the stabilizer friction strip 530 may have an upper member coefficient of friction. An upper member friction force may be required to slide the upper member friction element 552 along the stabilizer friction strip 530. The interface between the upper member friction element 552 and the stabilizer friction strip 530 may therefore be optimized for a desired upper member friction force.

The upper member friction force may be related to the amount of base torque required to rotate the stand 504 with respect to the base 502. For example, when the stabilizer connector 528 is connected to the base 502, rotating the stand 504 with respect to the base 502 may include sliding the upper member friction element 552 along the stabilizer friction strip 530. Therefore, increasing the upper member friction force between the upper member friction element 552 and the stabilizer friction strip 530 may increase the amount of torque required to rotate the stand 504 with respect to the base 502 when the stabilizer connector 528 is connected to the base 502.

In at least one embodiment, the stabilizer friction strip 530 is magnetic, and the friction member includes one or more upper member magnets 554. The stabilizer friction strip 530 may have a first magnetic polarity, and the one or more upper member magnets 554 may have a second magnetic polarity. The first magnetic polarity may be opposite from the second magnetic polarity such that the one or more upper member magnets 554 and the stabilizer friction strip 530 are magnetically attracted to each other. The strength of the magnetic attraction between the one or more magnets and the stabilizer friction strip 530, in combination with the coefficient of friction at the interface between the upper member friction element 552 and the stabilizer friction strip 530, may, at least in part, affect the upper member friction force. For example, a greater magnetic attraction between the one or more upper member magnets 554 and the magnetic stabilizer friction strip 530 may increase the upper member friction force. Conversely, a lesser magnetic attraction between the one or more upper member magnets 554 and the magnetic stabilizer friction strip 530 may decrease the upper member friction force.

In some embodiments, a contact area between the stabilizer friction strip 530 and the upper member friction element 552 affects the upper member friction force required to slide the upper member friction element 552 along the stabilizer friction strip 530. For example, a width of the stabilizer friction strip 530 and the upper member friction element 552 may be increased to increase the contact area, which may increase the upper member friction force. In other examples, a length of the upper member friction element 552 is increased to increase the contact area, which increases the upper member friction force.

A magnetic connection between the upper member friction element 552 and the stabilizer friction strip 530 may improve reliability of the base hinge 522. For example, a magnetic connection is easy for a user to re-connect if the upper member friction element 552 becomes separated from the stabilizer friction strip 530. In other examples, the magnetic strip and/or the one or more upper member magnets 554 may have a longer effective life, the magnetic attraction between the two remaining substantially the same until the magnetic strip and/or the one or more upper member magnets 554 are worn thin.

In some embodiments, the one or more upper member magnets 554 and/or the magnetic stabilizer friction strip 530 comprises a permanent magnet. For example, the one or more upper member magnets 554 and/or the magnetic stabilizer friction strip 530 may be made from iron-based magnets or magnetic alloys (e.g., ferrite, alnico, stainless steel, including 420 stainless steel), rare-earth magnets (e.g., neodymium, samarium-cobalt), minerals (e.g., magnetite, lodestone), any other magnetic material, or any combination of the foregoing. In some embodiments, the one or more upper member magnets 554 and/or the magnetic stabilizer friction strip 530 comprises an electromagnet.

In some embodiments, the upper member friction element 552 and the stabilizer friction strip 530 are non-magnetic. For example, the stabilizer friction strip 530 may be a slot, and the upper member friction element 552 may include a protrusion inserted with an interference fit into the slot. In other examples, the stabilizer friction strip 530 may be a dovetail slot, and the upper member friction element 552 may include a matching dovetail protrusion inserted into the dovetail slot and selectively tightened against the dovetail slot. In still other examples, the upper member friction element 552 may be a band, and the stabilizer friction strip 530 may be a support around which the band is wound and tightened.

The upper member friction element 552 may be rotationally connected to the upper member 524. In this manner, as the upper member friction element 552 slides along the stabilizer friction strip 530, the upper member friction element 552 may maintain full contact with the stabilizer friction strip 530. In some embodiments, the upper member friction element 552 is connected to the upper member 524 with any type of connection, such as a pinned connection. In some embodiments, the upper member friction element 552 is connected to the primary support with a ball and socket connection, or a strip of cloth or fabric.

In the embodiment shown, the stand 504 includes two primary friction strips 520 and a single stabilizer friction strip 530. The two primary friction strips 520 may be located on opposite sides of the single stabilizer friction strip 530. In some embodiments, the stand includes a plurality of stabilizer friction strips 530 and a single primary friction strip 520. A plurality of stabilizers 522 may be connected to the plurality of stabilizer friction strips 530. In some embodiments, the stand 504 includes any number of primary friction strips 520 and any number of stabilizer friction strips 530.

In at least one embodiment, the lower member 526 of the stabilizer 522 are connected to the base hinge 514. The lower member 526 may therefore be rotationally independent of both the base 502 and the stand 504. For example, the rotational position of the lower member 526 may be unaffected by any rotation of the base 502 with respect to the stand 504 or the stand 504 with respect to the base 502. In some embodiments, the lower member 526 is rotationally connected to the stand 504. In some embodiments, the lower member 526 is rotationally connected to the base 502.

Figure 6:
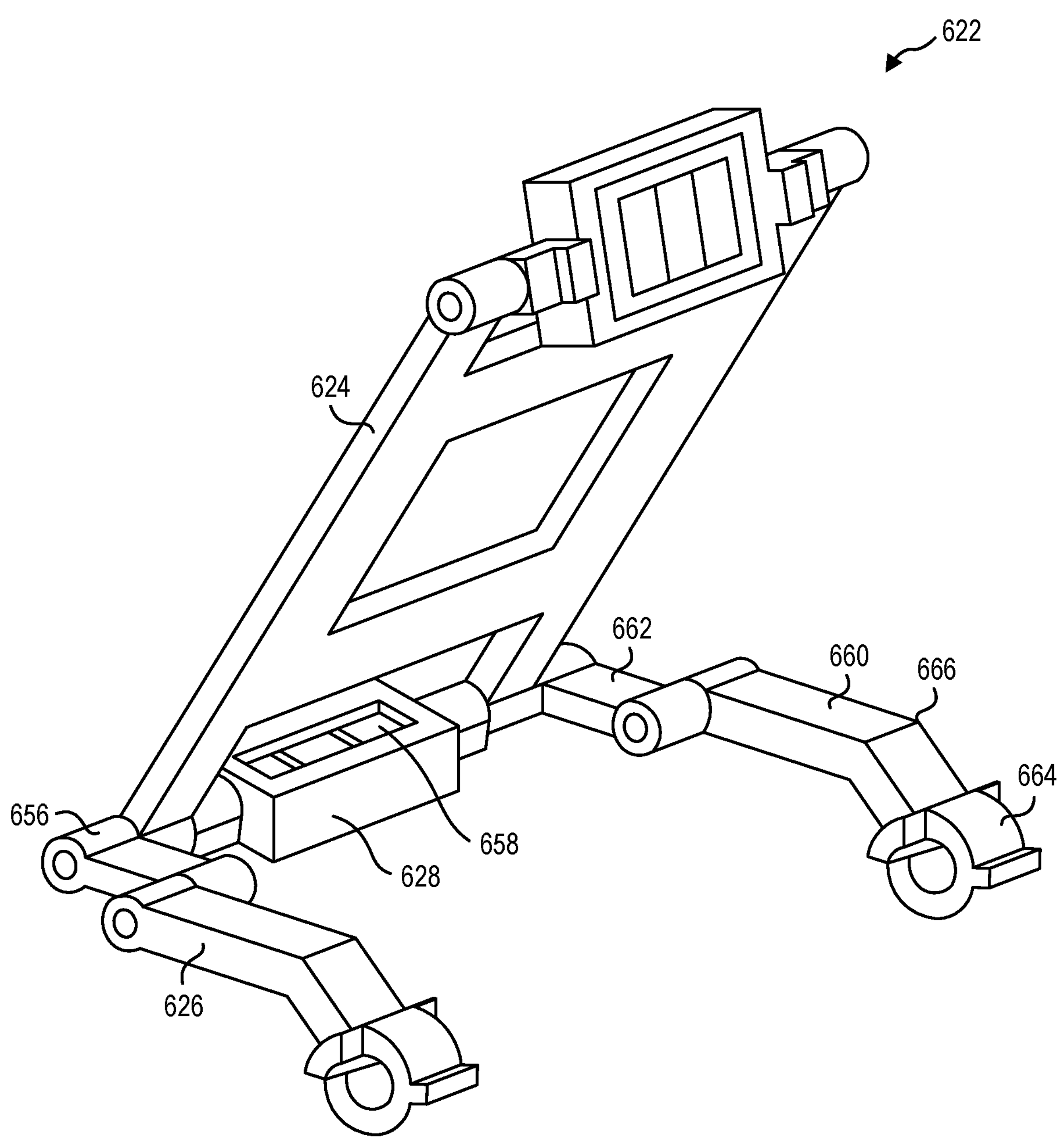
FIG. 6 is a perspective view of a stabilizer, according to at least one embodiment of the present disclosure.

FIG. 6 is a perspective view of a stabilizer 622, according to at least one embodiment of the present disclosure. The stabilizer 622 may include an upper member 624 and a lower member 626. The upper member 624 may be connected to the lower member 626 at a stabilizer connection 656. The stabilizer connection 656 may be a rotational connection, meaning that the upper member 624 may be rotatable relative to the lower member 626. A stabilizer connector 628 may be rotationally connected to the upper member 624 and the lower member 626 at the stabilizer connection 656. For example, the stabilizer connector 628 may rotate independently of the upper member 624 and the lower member 626. In some embodiments, the stabilizer connection 656 includes a pin extending through the upper member 624, the lower member 626 and the stabilizer connector 628.

The stabilizer connector 628 may be configured to connect to a display stabilizer receiver (e.g., the display stabilizer receiver 447 of FIG. 4) or a base stabilizer receiver (e.g., the base stabilizer receiver 231 of FIG. 2). The stabilizer connector 628 may include a stabilizer magnet 658. The display stabilizer receiver and/or the base stabilizer receiver (collectively, stabilizer receivers) may include a receiver magnet (not shown). The stabilizer magnet 658 may have a first polarity, and the receiver magnet may have a second polarity, the second polarity being opposite the first polarity. Therefore, the stabilizer magnet 658 may be magnetically attracted to the receiver magnet. Thus, the stabilizer connector 628 may be a magnetic connector. A magnetic stabilizer connector 628 may allow the stabilizer 622 to easily connect to and disconnect from a display (e.g., the display 106 of FIG. 1) or a base (e.g., the base 102 of FIG. 1). This may make it easy or convenient to change between configurations of a computing device.

The stabilizer connector 628 may have a different rotational angle depending on whether it is connected to the base or the display. Thus, when changing from connecting to the base to the display, or from the display to the base, the stabilizer connector 628 may need to be rotated so that it may properly connect to the display or to the base.

In some embodiments, the stabilizer connector 628 is rectangular in cross-section. Two or more of the sides of the stabilizer connector 628 may include a magnet, such as the stabilizer magnet 658. For example, opposite sides of the stabilizer connector 628 that include a stabilizer magnet 658 may assist the stabilizer connector 628 with connecting to the stabilizer receivers.

In some embodiments, a stabilizer magnet 658 is located on each of the four sides of the stabilizer connector 628. Therefore, a stabilizer magnet 658 will always be presented to a stabilizer receiver. In some embodiments, each side of the stabilizer connector 628 includes a stabilizer magnet 658 having the same polarity. Thus, each side of the stabilizer connector 628 may connect to the stabilizer receiver.

In some embodiments, adjacent sides of the stabilizer connector 628 include stabilizer magnets 658 having different polarities. When a stabilizer magnet 658 having an opposite polarity as a stabilizer receiver is presented to the stabilizer receiver, the stabilizer magnet 658 is magnetically attracted to the stabilizer receiver. When a stabilizer magnet 658 having the same polarity as the stabilizer receiver is presented to the stabilizer receiver, the stabilizer magnet is magnetically repulsed from the stabilizer receiver. This may cause the stabilizer connector 628 to rotate. As the stabilizer connector 628 is rotated, a stabilizer magnet 658 having the opposite polarity as the stabilizer receiver may be presented to the stabilizer receiver, and the stabilizer magnet 658 may be magnetically attracted to the stabilizer receiver. Thus, by including four stabilizer magnets 658 on the stabilizer connector 628, with adjacent sides of the stabilizer connector 628 having opposing polarity, the stabilizer connector 628 may automatically rotate to connect to the stabilizer receiver of the base or the display.

In some embodiments, the stabilizer connector 628 has a transverse cross-section having a different shape, including circular, triangular, pentagonal, hexagonal, heptagonal, octagonal, polygonal of any number of sides, asymmetrically polygonal, non-polygonal, or any other shape. In some embodiments, the stabilizer connector 628 includes a non-magnetic connection. In some examples, the stabilizer receiver includes an indentation or a cavity, and the stabilizer connector 628 includes a protrusion configured to be inserted into the indentation or cavity with a friction or interference fit. In other examples, the stabilizer receiver may connect to the stabilizer connector 628 with a snap or a button. In still other examples, the stabilizer connector 628 includes a Velcro connection. A Velcro connection may be agnostic to the rotational angle of the stabilizer connector 628.

The lower member 626 may include a primary lower member 660 and a secondary lower member 662. The primary lower member 660 and the secondary lower member 662 may be connected with a rotatable connection. This may allow for precise placement of the stabilizer connector 628 with respect to the stabilizer receiver, regardless of the location or relative angular orientation of the stabilizer receiver.

The primary lower member 660 may include a base hinge connector 664. The base hinge connector 664 may connect the lower member 626 to the base hinge (e.g., the base hinge 114 of FIG. 1). The base hinge connector 664 may include a hollow cylindrical clamp that clamps onto a pin of the base hinge. Therefore, the primary lower member 626 may rotate about the base hinge independent of the base or the stand (e.g., the stand 104 of FIG. 1). The primary lower member 660 may further include a bend 666 between the base hinge connector 664 and the secondary lower member 662. The bend 666 may allow the primary lower member 660 to lay flat against the base while still connected to the base hinge with the base hinge connector 664.

Figures 1, 7:
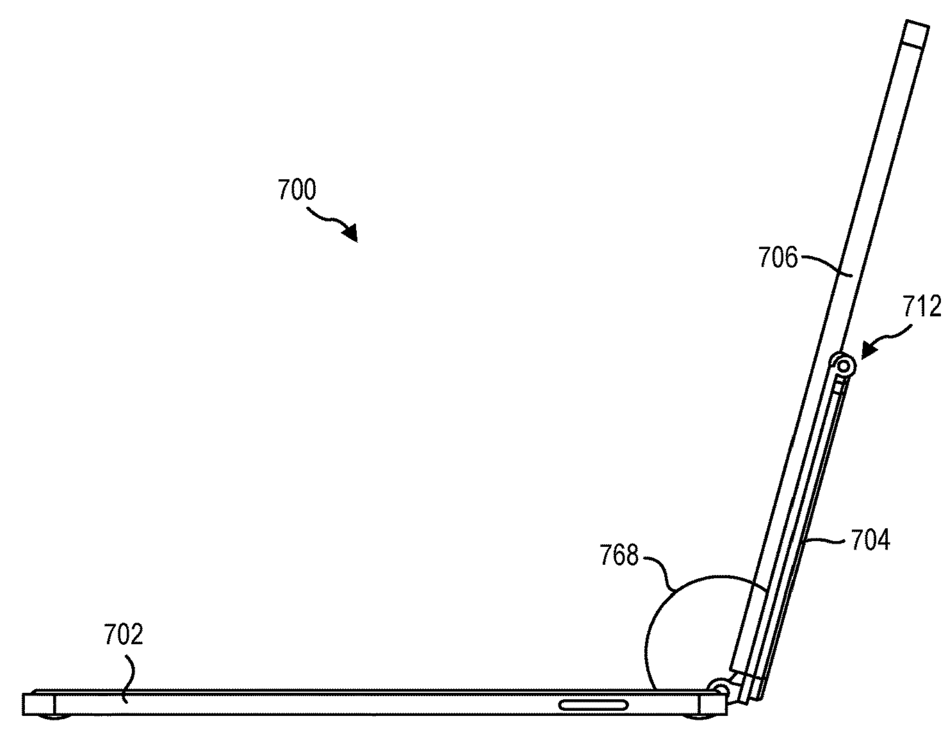
Figures 2, 7:
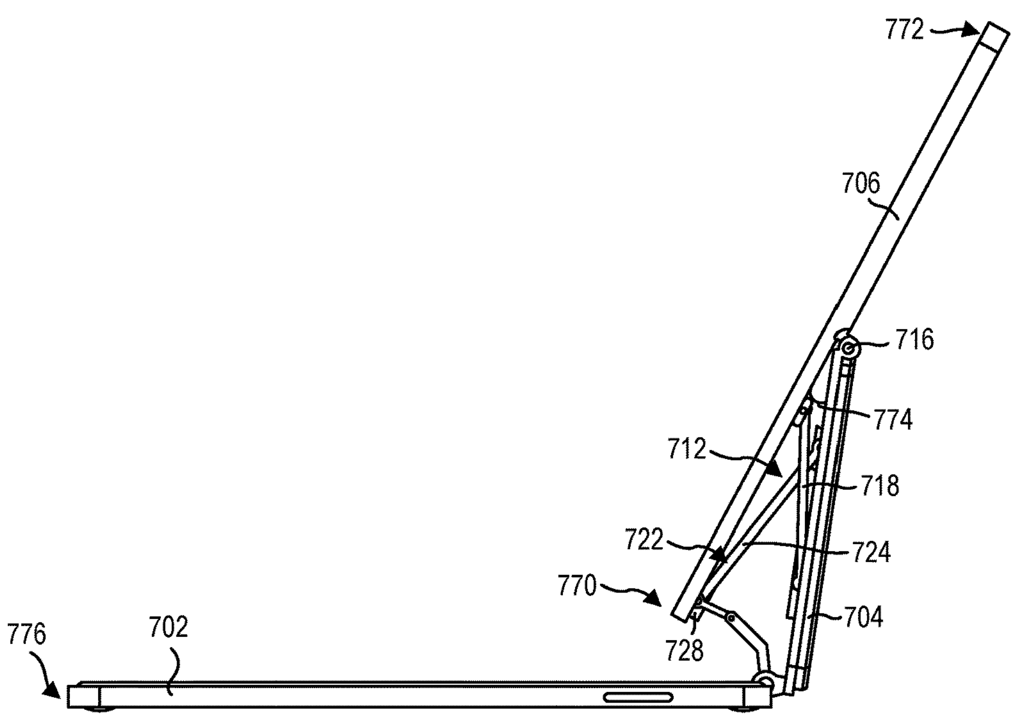
Figures 3, 7:
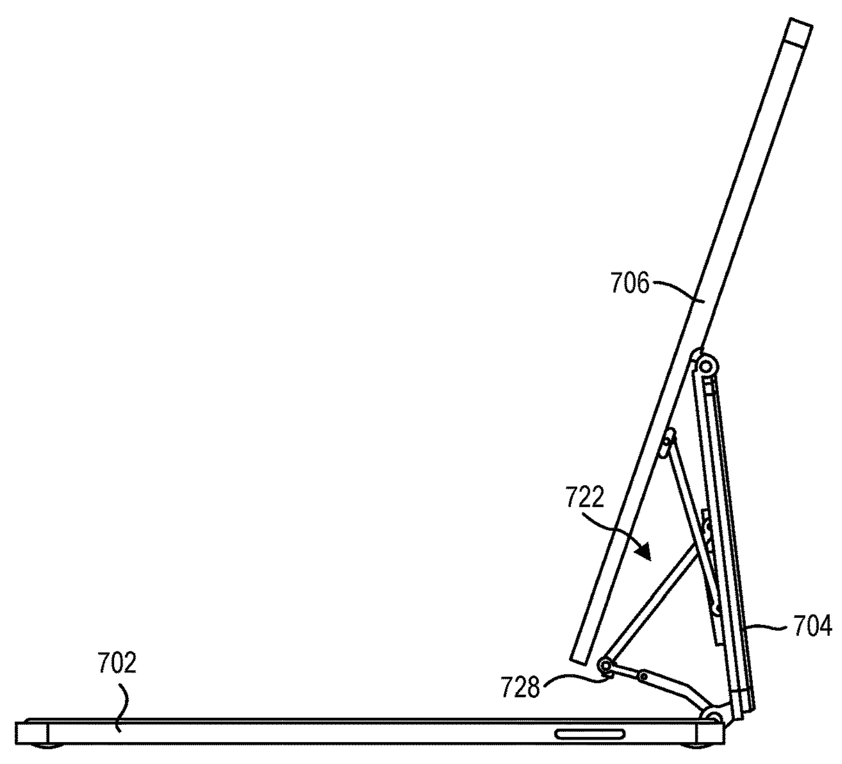
Figures 4, 7:
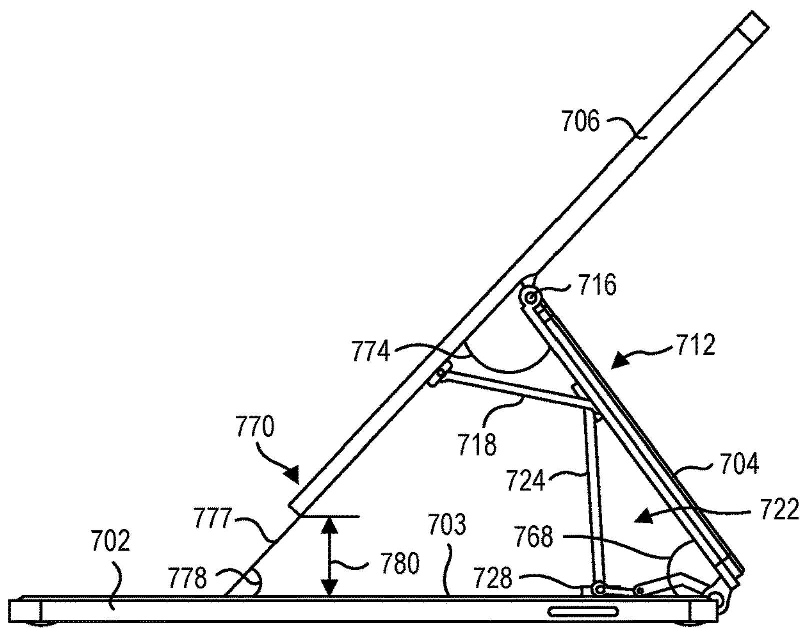

FIG. 7-1 through 7-4 are representations of a computing device 700 at various locations while a display 706 is rotated about a display hinge 712 from a laptop configuration to a studio configuration, according to at least one embodiment of the present disclosure. FIG. 7-1 is a representation of the computing device 700 in a laptop configuration. In this configuration the display 706 may be parallel or approximately parallel to the stand 704. The stand 704 may be rotated with a stand angle 768 relative to the base 702. In some embodiments, the stand angle 768 may be in a range having an upper value and a lower value, or upper and lower values including any of 0°, 15°, 30°, 45°, 60°, 75°, 90°, 105°, 120°, 135°, or any value therebetween. For example, the stand angle 768 may be 0° (e.g., the computing device 700 may be closed). In other examples, the stand angle 768 may be less than 135°. In yet other examples, the stand angle 768 may be greater than 135°.

In FIG. 7-2, the display 706 has rotated about a display hinge 712 relative to the view shown in FIG. 7-1. The display 706 may be connected to the stand 704 at a stand hinge 716. In at least one embodiment, the stand hinge 716 is located at the center of the display 706. In some embodiments, the stand hinge 716 is located at a stand hinge position a percentage of a display distance between a display first end 770 and a display second end 772. In some embodiments, the stand hinge position is in a range having an upper value and a lower value, or upper and lower values including any of 10%, 20%, 25%, 30%, 33%, 40%, 50%, 60%, 66%, 70%, 75%, 80%, 90%, or any value therebetween of the display distance. For example, the stand hinge position may greater than 10% of the display distance. In other examples, the stand hinge position is less than 90% of the display distance. In yet other examples, the stand hinge position may be any value in a range between 10% and 90% of the display distance. In still other examples, the stand hinge 716 is located at the display first end 770 or the display second end 772. The stand hinge position may change the amount that the display 706 overlaps the base 702 for a given stand angle 768. This may allow a user to increase or decrease a footprint of the computing device 700 in the studio configuration.

The display 706 may be rotated with respect to the stand 704 with a display hinge angle 774. In some embodiments, the display hinge angle 774 is in a range having an upper value and a lower value, or upper and lower values including any of 0°, 15°, 30°, 45°, 60°, 75°, 90°, 105°, 120°, 135°, or any value therebetween. For example, the display hinge angle 774 may be 0° (e.g., the display 706 may be parallel to the stand 704). In other examples, the display hinge angle 774 is less than 135°. By changing the display hinge angle 774 while keeping the stand angle 768 the same, the display first end 770 may be moved toward a base first end 776, and the display first end 770 may overhang at least a portion of the base 702.

As the display 706 is rotated with respect to the stand 704, the one or more primary supports 718 may slide along a primary friction strip (e.g., primary friction strip 520 of FIG. 5) on the stand 704. The upper member 724 of the stabilizer 722 may slide along a stabilizer friction strip (e.g., stabilizer friction strip 530 of FIG. 5) on the stand 704. The friction of the primary supports 718 and/or the upper member 724 may have a combined display hinge coefficient of friction that requires a display hinge friction force to overcome. In at least one embodiment, the display 706 is prevented from rotated about the display hinge 712 upon application of a display torque. For example, the display hinge 712 may withstand the display torque while maintaining the display hinge angle 768. Applying the display torque to the display 706 may apply the display hinge friction force to the display hinge 712, thereby rotating the display 706. In some embodiments, the display torque is in a range having an upper value and a lower value, or upper and lower values including any of 0.25 N m, 0.5 N m, 0.75 N m, 1.0 N m, 1.25 N m, 1.5 N m, 1.75 N m, 2.0 N m, or any value therebetween. For example, the display torque may greater than 0.25 N m. In other examples, the display torque is less than 2.0 N m. In yet other examples, the display torque is any value in a range between 0.25 N m and 2.0 N m.

In the embodiment shown, a clockwise display torque rotates the display first end 770 away from the stand 704. This may cause the primary supports 718 to slide up the stand 704 along the primary friction strips. When the stabilizer connector 728 is connected to the display 706, a clockwise display torque may cause the upper member 724 to slide down the stand 704 along the stabilizer friction strip. When the stabilizer connector 728 is connected to the display 706, the display torque required to rotate the display 706 may be increased because of the sliding of the upper member 724 along the stabilizer friction strip.

As the display hinge angle 774 increases, the stabilizer connector 728 may be disconnected from the display 706, as shown in FIG. 7-3. In this manner, in at least one position or configuration, the stabilizer 722 may not be connected to the display 706 or the base 702. As the stand 704 is rotated toward the base 702, thereby decreasing the stand angle 768, the stabilizer connector 728 may connect to the base 702, which may place the computing device 700 into a studio mode, as shown in FIG. 7-4.

The display 706 may be oriented with respect to the base 702 with a display angle 778. The display angle 778 may be the angle between an extension of the display 706 by the reference line 777 and the base 702. The display angle 778 may be the angle at which a user interacts with or engages the computing device 706. In some embodiments, the display angle 778 is in a range having an upper value and a lower value, or upper and lower values including any of 0°, 15°, 30°, 45°, 60°, 75°, 90°, 105°, 120°, 135°, 150°, 165°, 180° or any value therebetween. For example, the display angle 778 may be 0° (e.g., the display 706 may be parallel to the base). In other examples, the display angle 778 is between 0° and 90°. In still other examples, the display angle 778 is between 0° and 30°.

The base 702, the stand 704, and the display 706, extended by a reference line 777 to the base 702, may form a triangle. The three angles of the triangle may include the stand angle 768, the display hinge angle 774, and the display angle 778. As discussed above, the stand angle 768 may be adjusted by rotating the stand 704 with respect to the base 702, which may cause the upper member 724 to slide along the stabilizer friction strip on the stand 704. The display hinge angle 774 may be adjusted by rotating the display 706 with respect to the stand 704, which may cause the primary support 718 to slide along the primary friction strip on the stand 704. Because a triangle must always include 180°, the display angle 778 may be determined by subtracting the display hinge angle 774 and the stand angle 768 from 180°. Therefore, by rotating the stand 704 with respect to the base 702 and the display 706 with respect to the stand 704, the display angle 778, and therefore the orientation of the display 706, may be optimized by a user based on his or her preferences. For example, the user may change the display angle 778 based on visual preferences, such as to reduce glare or increase visibility of the display 706. In other examples, the user may change the display angle 778 based on ergonomic preferences, such as to change the angle at which the user's head is oriented with respect to the display.

In the studio mode, the display 706 may be fully supported by the stand 704.

For example, the display 706 may not directly contact or touch the base 702. Thus, at least a portion of the display 706 may overlap, or cover, the base 702. In at least one embodiment, display 706 overlaps at least a portion of an input device 703 on the base 702. For example, the input device 703 may be a keyboard or a track pad, and the display 706 may overlap a portion or all of the keyboard or the track pad.

The display 706 may overlap an overlap percentage of the base 702. The overlap percentage may be the percentage of the base that is overlapped or covered by the display 706. In some embodiments, the overlap percentage is in a range having an upper value and a lower value, or upper and lower values including any of 10%, 20%, 25%, 30%, or any value therebetween. For example, the overlap percentage may greater than 10%. In other examples, the overlap percentage may be less than 30%. In yet other examples, the overlap percentage is any value in a range between 10% and 30%. In still other examples, overlap percentage is 100%, such that the display 706 overlaps an entirety of the base 702.

By overlapping the base, the computing device 700 may be used in compact situations. For example, for a given display angle 778, the computing device 700 in studio mode may have a significantly smaller footprint than a laptop computer with the same or a similar display angle. This may especially be useful for a user operating the computing device 700 in confined spaces, such as on an airplane, a train, a bus, a motor vehicle, other forms of public or private transportation, a classroom desk, a small table, and any other space.

The display first end 770 may be located above the base 702 with a first end height 780. In some embodiments, the first end height 780 is in a range having an upper value and a lower value, or upper and lower values including any of 1 cm, 2 cm, 3 cm, 4 cm, 5 cm, 6 cm, 7 cm, 8 cm, or any value therebetween. For example, the first end height 780 may greater than 1 cm. In other examples, the first end height 780 is less than 8 cm. In yet other examples, the first end height 780 is any value in a range between 1 cm and 8 cm.

The first end height 780 may be optimized to a user's preferences by adjusting the display hinge angle 774, the stand angle 768, and the display angle 778. For example, the first end height 780 may be adjusted to allow a user's hands to operate the input device 703 underneath the display 706, or between the display 706 and the base 702. This may further enable the user to use the computing device 700 in compact locations. Many users are more proficient at typing on a mechanical keyboard. Indeed, a user may not need to see the keys of a mechanical keyboard to effectively type. By typing on a keyboard located on the base with her hands between the display 706 and the base 702, a user may operate the computing device on a reduced footprint.

A user may wish to interact with a touch-sensitive display on the display 706. It may be difficult for the user to effectively interact with the area of the display 706 near the display first end 770. For example, some users may draw on the display 706 with an electronic pen, and the user may have to contort his hand to draw on the display 706 near the display first end 770, which may result in undesirable drawings. The user may adjust the first end height 780 sufficient to comfortably interact with the display 706 near the display first end 770.

As the user interacts with the display 706, especially with a touch-sensitive display, the user will exert a use force on the display 706. This use force may exert a display torque about the second hinge 712. Because of a combination of friction from the stand hinge 716 and the sliding of the primary support 718 along the primary friction strip, the second hinge 712 may resist rotation caused by the use force. A breakout display torque may be the torque required to begin rotating the display about the second hinge 712. The breakout display torque may be adjusted by adjusting the friction of the primary support 718 along the friction strip. The breakout display torque may be balanced with the use force, such that the use force may not rotate the display 706, until the use force reaches the breakout display torque. The breakout torque may be optimized so that it is not so low that a normal use force may unintentionally rotate the display 706, but not so high that a user has difficulty rotating the display 706.

A least a portion of the use force may be transferred from the display to the stand 704. The stabilizer 722 may transfer at least part of the portion of the use force to the base 702. This may help reduce rotation of the stand 704 as a result of the use force. This in turn, may help to provide a stable platform against which the user may operate the computing device 700.

Figures 1, 8:
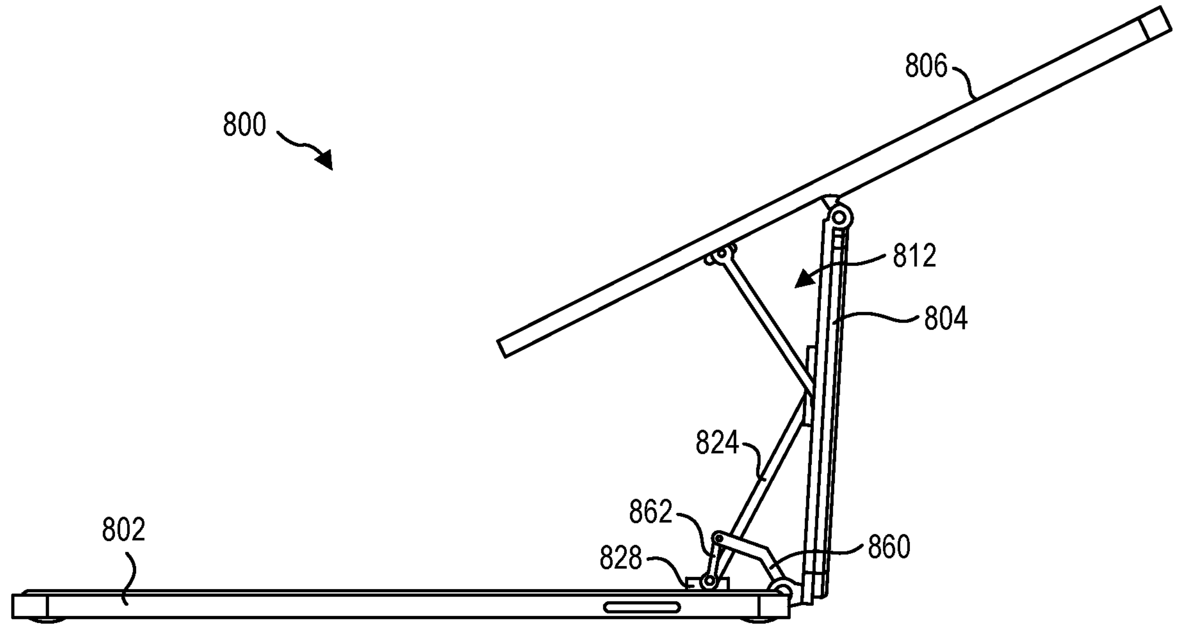
Figures 2, 8:
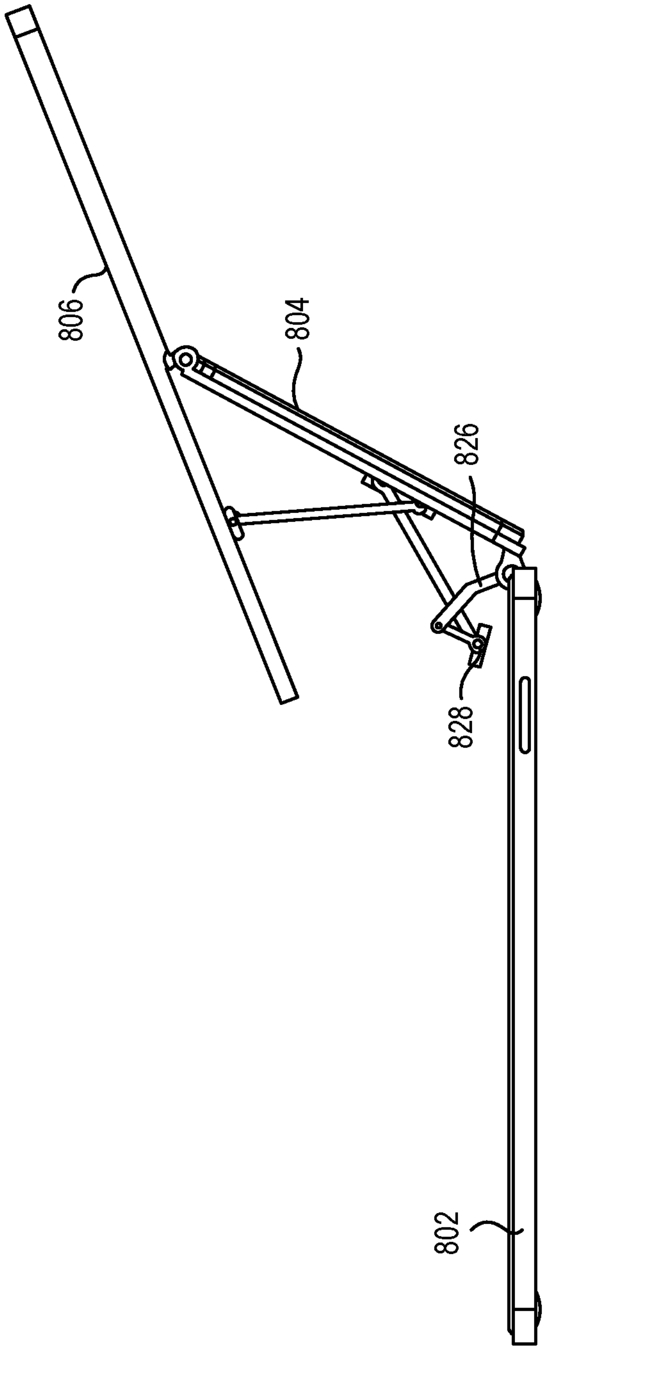
Figures 3, 8:
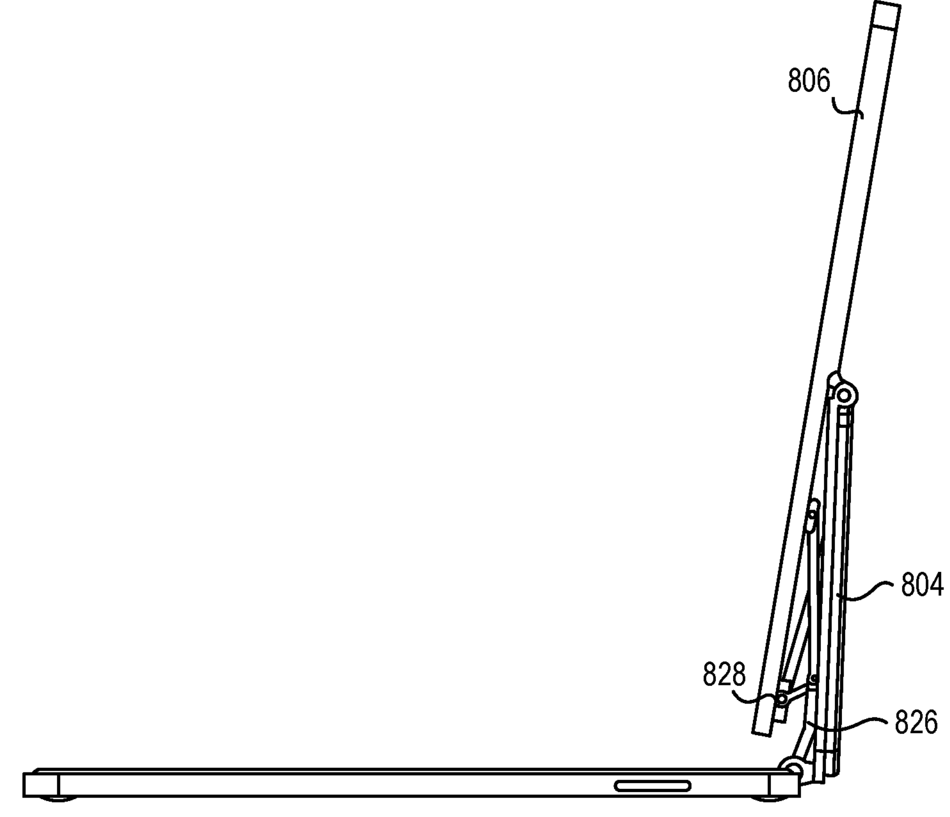

FIG. 8-1 through 8-4 are representations of a computing device 800 at various locations while a display 806 is rotated about a display hinge 812 from a studio configuration to a laptop configuration, according to at least one embodiment of the present disclosure. As seen in FIG. 8-1, the stand 804 has been rotated clockwise with respect to the base 802. This may pull the stabilizer connector 828 toward the stand 804. This may cause the secondary lower member 862 to pull toward the stand 804, and to rotate counterclockwise relative to the primary lower member 860. Moving the stabilizer toward the stand 804 may further cause the upper member 824 to slide down the stabilizer friction strip on the stand 804.

FIG. 8-2 shows the stand 804 being rotated further clockwise with respect to the base 802. This may cause the stabilizer connector 828 to disconnect from the base stabilizer receiver. In at least one embodiment, the display 806 rotates (clockwise or counterclockwise) with respect to the stand 804 while the stand 804 is rotating counterclockwise.

After the stabilizer connector 828 has been disconnected from the base 802, the lower member 826 may move toward the stand 804. In some embodiments, the lower member 826 is moved toward the stand 804 manually by a user. In some embodiments, the lower member 826 is urged toward the stand 804 using a spring in the lower member 826. In some embodiments, the lower member 826 is urged toward the stand 804 using a pair of magnets.

FIG. 8-3 shows the display 806 rotated clockwise with respect to the stand 804 until the stabilizer connector 828 has connected to a display connector receiver. The lower member 826 may be flush with or pressed against the stand 804, and the stand 804 may be rotated until it is parallel with the stand 804. In this manner, the computing device may move between the studio configuration and the laptop configuration.

Figure 9:
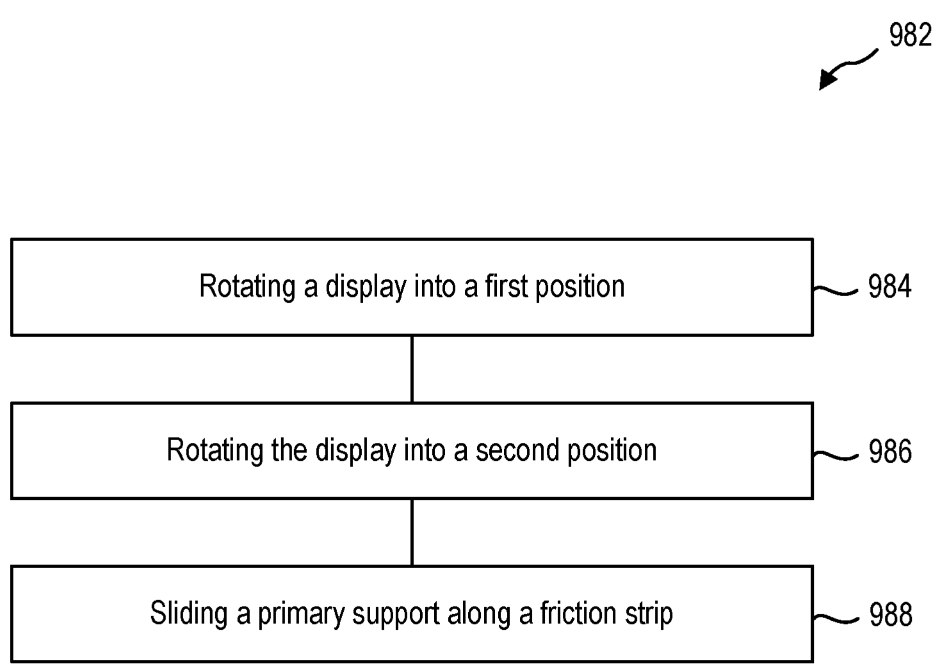
FIG. 9 is a method chart for a method of operating a hinge, according to at least one embodiment of the present disclosure.

FIG. 9 is a method chart for a method 982 of operating a hinge, according to at least one embodiment of the present disclosure. The method 982 includes rotating a display into a first position at 984. Rotating the display into the first position may include rotating a stand connected to the display into a stand first position, the display being parallel to the stand. The display first position may be relative to a base. Rotating the display into the second position may include rotating the display from the first position to the second position.

The method 982 further includes rotating the display into a second position at 986. The display may be rotated about the stand with a display hinge. The display may rotate about the stand at a stand first end. The stand may be connected to the base at a stand second end with a base hinge. Rotating the display into the second position may include disconnecting a stabilizer from the display and connecting the stabilizer to the base. In at least one embodiment, rotating the display to the first position includes rotating the display from the second position to the first position.

The method 982 optionally includes sliding a primary support along a friction strip on the stand at 988. The primary support may be connected to the display at a fixed, rotatable connection. The primary support may be magnetically connected to the friction strip such that a friction force is required to slide the primary support along the friction strip. The primary support may be slid along the friction strip as the display is rotated to the second position. For example, rotating the display to the second position may include sliding the primary support along the friction strip. In at least one embodiment, rotating the display to the first position includes disconnecting the stabilizer from the base and connecting the stabilizer to the display.

INDUSTRIAL APPLICABILITY

This disclosure generally relates to devices and methods relating to a display hinge for computing devices. For example, a computing device includes multiple hinges between a display component (e.g., a touchscreen) and a base component (e.g., a keyboard) configured to facilitate transitions between different operating postures, such as between a laptop posture and a studio posture in accordance with some embodiments.

In some embodiments, a computing device may include a base, a stand, and a display. The base may include one or more input devices. The one or more input devices may include a keyboard, a track pad, a track pad button, a mouse, a touch sensitive display, an electronic pen, any other input device, or any combination of the foregoing.

The display may include a monitor, an LED/LCD display, a touch sensitive display, or any combination of the foregoing. The display may further include one or more processors and/or computing elements. For example, the display may be a computing device, such as a tablet or a mobile phone. In some embodiments, the display includes an input device, such as a touch sensitive display, a track pad, an electronic pen, a button, a keyboard, any other input device, or any combination of the foregoing.

The stand may rotatably connect the display to the base. In this manner, the computing device may change between a plurality of configurations, as will be discussed herein. The stand has a stand first end and a stand second end. A base hinge may rotatably connect the stand to the base at the stand second end.

In some embodiments, the base hinge is a friction hinge. For example, the base hinge may have a base hinge coefficient of friction sufficient that the base hinge may maintain a stand angle between the stand and the base absent a base torque about the base hinge. The base torque about the base hinge may be the minimum torque required to change the stand angle. The base hinge may be any friction hinge known in the art. For example, the base hinge may include one or more piano hinges having a central pin that extends through a plurality of hinge members with an interference fit such that the hinge members clamp down on the central pin. In other examples, the base hinge may include one or more springs, threaded connections, or other hinge members, connected in such a way to require a base torque applied about the base hinge to rotate the stand relative to the base.

A display hinge may rotatably connect the stand to the display. In some embodiments, the display hinge is a friction hinge. For example, the elements of the display hinge may have a combined display hinge coefficient of friction. The display hinge coefficient of friction may be sufficient to maintain a display hinge angle between the display and the stand absent a display breakout torque on the display. The display breakout torque may be the minimum torque required to rotate the display about the display hinge. The display hinge may include a stand hinge between the display and the stand. The stand hinge may be any type of hinge. For example, the stand hinge may be a friction hinge similar to the base hinge. In other examples, the stand hinge may be a piano hinge that requires a torque to rotate the display with respect to the stand. In still other examples, the stand hinge may include one or more strips of fabric or cloth between the stand and the display.

The display hinge may include a primary support. The primary support may connect the stand to the display. In some embodiments, the primary support is rotatably connected to the display at a fixed location (not shown in this view) and to the stand at a primary friction strip. As the primary support slides up and down the primary friction strip, a display hinge angle between the display and the stand may change.

The display hinge may further include a stabilizer. The stabilizer may include an upper member and a lower member. The upper member may connect to the lower member at a stabilizer connector. In at least one embodiment, the stabilizer connector releasably connects to the base. In some embodiments, the stabilizer connector releasably connects to the display. In this manner, the stabilizer may stabilize the display and/or the stand.

The upper member may connect to the stand along a stabilizer friction strip. The upper member may slide along the stabilizer friction strip. As the upper member slides along the stabilizer friction strip, the stand angle between the stand and the base may change.

By rotating the stand about the base hinge and/or the display about the display hinge, the computing device may switch between two or more configurations. For example, in the embodiment shown, the computing device is in a studio configuration. In the studio configuration, the display may be rotated at an angle with respect to the stand. For example, the display may be non-parallel to the stand. The display may be rotated such that at least a portion of the display is located over at least a portion of the base, or overlaps at least a portion of the base. In some embodiments, the display contacts or rests against the base. In some embodiments, the display does not contact or touch the base. In some embodiments, the display is located above or overlaps one or more input device. In at least one embodiment, the studio configuration allows a user to selectively adjust the height, overlap, and/or angle of the display. In some embodiments, the studio configuration allows the user to operate the computing device in a confined area. This increases the versatility of the computing device, allowing it to be used in more locations and/or situations, such as in transit (e.g., on an airplane) or in locations lacking a traditional desk and office chair.

In some embodiments, a computing device may be in a laptop configuration. In the laptop configuration, a display may be rotated about a display hinge such that the display is parallel to a stand. As the stand is rotated about a base hinge with respect to the base, the display may be rotated as well. Thus, in the laptop configuration, the computing device may resemble a traditional laptop, in that the display is located at an angle relative to the base, and a majority or an entirety of the base and/or an input device is exposed. Including both a studio configuration and a laptop configuration increases the versatility of the computing device by providing for use in many situations as noted above.

The base may include a base stabilizer receiver. The base stabilizer receiver may be configured to receive or connect to a stabilizer connector. In this manner, the stand may be stabilized or supported by the stabilizer when the computing device is in the studio mode.

In some embodiments, a computing device may be folded into a closed configuration. In the closed configuration, the display may be parallel or approximately parallel to the stand and the base. In this manner, the computing device may occupy a small volume, thereby enabling easy transport and/or storage. The stand may be located on the outside of the computing device, covering at least a portion of the display in the closed configuration. The base may be located on an outside of the computing device, opposite the stand. In this manner, the display may be located between the stand and the base in the closed configuration.

In some embodiments, the display may be connected to the stand with a display hinge. The display hinge may include one or more primary supports. The primary supports have a primary support first end and a primary support second end. The primary support first end may attach to the display at a primary support connection. The primary support connection may be a rotational connection such that the primary support may be rotationally connected to the display at the primary support attachment. In this manner, the primary support may rotate about the primary support first end at the primary support connection. In at least one embodiment, the primary support connection is a fixed connection, meaning that the primary support does not slide with respect to the display, although it may rotate with respect to the display about the fixed connection. For example, the primary support may be rotationally, but not slidably, connected to the display.

The primary support may be slidably connected to the stand at the primary support second end with a stand connection. The stand connection may include a primary friction strip on the stand. The primary support may include a friction member. The friction member may be slidably connected to the primary friction strip. For example, the friction member may slide along the primary friction strip. The interface between the friction member and the primary friction strip may have a coefficient of friction. A primary support friction force may be required to slide the friction member along the primary friction strip. The interface between the friction member and the primary friction strip may therefore be optimized for a desired primary support friction force. The primary support friction force may be related to the amount of display torque required to rotate the display about the display hinge. For example, an increased primary support friction force required to slide the friction member along the primary friction strip may increase the display torque required to rotate the display, and a decreased primary support friction force may decrease the display torque required to rotate the display.

In at least one embodiment, the primary friction strip is magnetic, and the friction member includes one or more magnets. The primary friction strip may have a first magnetic polarity, and the one or more magnets may have a second magnetic polarity. The first magnetic polarity may be opposite from the second magnetic polarity such that the one or more magnets and the primary friction strip are magnetically attracted to each other. The strength of the magnetic attraction between the one or more magnets and the primary friction strip, in combination with the coefficient of friction at the interface between the friction member and the primary friction strip, may, at least in part, affect the primary support friction force required to slide the friction member along the primary friction strip. For example, a greater magnetic attraction between the one or more magnets and the magnetic primary friction strip may increase the primary support friction force. Conversely, a lesser magnetic attraction between the one or more magnets and the magnetic primary friction strip may decrease the primary support friction force.

In some embodiments, a contact area between the primary friction strip and the friction member affects the primary support friction force. For example, a width of the primary friction strip and the friction member may be increased to increase the contact area, which may increase the primary support friction force. In other examples, a length of the friction member may be increased to increase the contact area, which may increase the primary support friction force.

In the embodiment shown, the display hinge includes two primary supports, each primary support including its own primary friction strip and friction member. In some embodiments, the display hinge includes a single primary support and associated primary friction strip and friction member. In yet other examples, the display hinge includes more than two primary supports, including three, four, five, six, or more primary supports and associated friction strips and friction members. Multiple friction strips and friction members may combine for an effective contact area. The effective contact area may be a sum of the individual contact areas experienced by each primary friction strip and friction member. Therefore, by increasing or decreasing the number of primary supports, the effective contact area may be increased or decreased. This in turn may increase or decrease the amount of display torque required to rotate the display hinge.

A magnetic connection between the friction member and the primary friction strip may improve reliability of the display hinge. For example, a magnetic connection may be relatively easy for a user to re-connect if the friction member becomes separated from the primary friction strip. In other examples, the magnetic strip and/or the one or more magnets may have a longer effective life, the magnetic attraction between the two remaining substantially the same until the magnetic strip and/or the one or more magnets are worn thin.

In some embodiments, the one or more magnets and/or the magnetic primary friction strip comprises a permanent magnet. For example, the one or more magnets and/or the magnetic primary friction strip may be made from iron-based magnets or magnetic alloys (e.g., ferrite, alnico), rare-earth magnets (e.g., neodymium, samarium-cobalt), minerals (e.g., magnetite, lodestone), any other magnetic material, or any combination of the foregoing. In some embodiments, the one or more magnets and/or the magnetic primary friction strip comprises an electromagnet.

In some embodiments, the friction member and the primary friction strip are non-magnetic. For example, the primary friction strip may be a slot, and the friction member may include a protrusion inserted with an interference fit into the slot. In other examples, the primary friction strip may be a dovetail slot, and the friction member may include a matching dovetail protrusion inserted into the dovetail slot and selectively tightened against the dovetail slot. In still other examples, the friction member may be a band, and the primary friction strip may be a support around which the band is wound and tightened.

The friction member may be rotationally connected to the primary support. In this manner, as the friction member slides along the primary friction strip, the friction member may maintain full contact with the primary friction strip. In some embodiments, the friction member is connected to the primary support with any type of connection. In some embodiments, the primary support may include a fork at the primary support second end. The friction member may be located between the prongs of the fork with a pinned connection. In some embodiments, the friction member is connected to the primary support with a ball and socket connection, a strip of cloth or fabric, or a pinned connection at the top of the friction member.

The display may include one or more indentations. The one or more indentations may correspond to elements of the display hinge and/or other elements connected to the stand. In this manner, as the stand is rotated toward the display, elements of the display hinge and/or other elements connected to the stand may protrude into the one or more corresponding indentations. Therefore, the stand may be rotated to parallel to the display without the elements of the display hinge and/or other elements connected to the stand getting in the way. This may reduce the total width of the computing device when in the laptop configuration and in the closed configuration. For example, by including the one or more indentations in the display, the stand may be able to lay flat against the display.

The display may include a display stabilizer receiver. The display stabilizer receiver may be configured to receive or connect to a stabilizer connector. In this manner, the display may be secured to the stand by the stabilizer. This helps the display to remain parallel to the stand in the closed configuration and/or the laptop configuration.

In some embodiment, a stand may be connected to the base at a base hinge. The stand may further be connected to the base with a stabilizer. The stabilizer may include an upper member and a lower member. The upper member has an upper member first end and an upper member second end. The upper member first end may be connected to the lower member at a stabilizer connector. The upper member second end may include an upper member friction element.

The upper member friction element may be connected to a stabilizer friction strip located on the stand. The upper member friction element may be slidably connected to the stabilizer friction strip. For example, the upper member friction element may slide along the stabilizer friction strip. The interface between the upper member friction element and the stabilizer friction strip may have an upper member coefficient of friction. An upper member friction force may be required to slide the upper member friction element along the stabilizer friction strip. The interface between the upper member friction element and the stabilizer friction strip may therefore be optimized for a desired upper member friction force.

The upper member friction force may be related to the amount of base torque required to rotate the stand with respect to the base. For example, when the stabilizer connector is connected to the base, rotating the stand with respect to the base may include sliding the upper member friction element along the stabilizer friction strip. Therefore, increasing the upper member friction force between the upper member friction element and the stabilizer friction strip may increase the amount of torque required to rotate the stand with respect to the base when the stabilizer connector is connected to the base.

In at least one embodiment, the stabilizer friction strip is magnetic, and the friction member includes one or more upper member magnets. The stabilizer friction strip may have a first magnetic polarity, and the one or more upper member magnets may have a second magnetic polarity. The first magnetic polarity may be opposite from the second magnetic polarity such that the one or more upper member magnets and the stabilizer friction strip are magnetically attracted to each other. The strength of the magnetic attraction between the one or more magnets and the stabilizer friction strip, in combination with the coefficient of friction at the interface between the upper member friction element and the stabilizer friction strip, may, at least in part, affect the upper member friction force. For example, a greater magnetic attraction between the one or more upper member magnets and the magnetic stabilizer friction strip may increase the upper member friction force. Conversely, a lesser magnetic attraction between the one or more upper member magnets and the magnetic stabilizer friction strip may decrease the upper member friction force.

In some embodiments, a contact area between the stabilizer friction strip and the upper member friction element affects the upper member friction force required to slide the upper member friction element along the stabilizer friction strip. For example, a width of the stabilizer friction strip and the upper member friction element may be increased to increase the contact area, which may increase the upper member friction force. In other examples, a length of the upper member friction element is increased to increase the contact area, which increases the upper member friction force.

A magnetic connection between the upper member friction element and the stabilizer friction strip may improve reliability of the base hinge. For example, a magnetic connection is easy for a user to re-connect if the upper member friction element becomes separated from the stabilizer friction strip. In other examples, the magnetic strip and/or the one or more upper member magnets may have a longer effective life, the magnetic attraction between the two remaining substantially the same until the magnetic strip and/or the one or more upper member magnets are worn thin.

In some embodiments, the one or more upper member magnets and/or the magnetic stabilizer friction strip comprises a permanent magnet. For example, the one or more upper member magnets and/or the magnetic stabilizer friction strip may be made from iron-based magnets or magnetic alloys (e.g., ferrite, alnico, stainless steel, including 420 stainless steel), rare-earth magnets (e.g., neodymium, samarium-cobalt), minerals (e.g., magnetite, lodestone), any other magnetic material, or any combination of the foregoing. In some embodiments, the one or more upper member magnets and/or the magnetic stabilizer friction strip comprises an electromagnet.

In some embodiments, the upper member friction element and the stabilizer friction strip are non-magnetic. For example, the stabilizer friction strip may be a slot, and the upper member friction element may include a protrusion inserted with an interference fit into the slot. In other examples, the stabilizer friction strip may be a dovetail slot, and the upper member friction element may include a matching dovetail protrusion inserted into the dovetail slot and selectively tightened against the dovetail slot. In still other examples, the upper member friction element may be a band, and the stabilizer friction strip may be a support around which the band is wound and tightened.

The upper member friction element may be rotationally connected to the upper member. In this manner, as the upper member friction element slides along the stabilizer friction strip, the upper member friction element may maintain full contact with the stabilizer friction strip. In some embodiments, the upper member friction element is connected to the upper member with any type of connection, such as a pinned connection. In some embodiments, the upper member friction element is connected to the primary support with a ball and socket connection, or a strip of cloth or fabric.

In the embodiment shown, the stand includes two primary friction strips and a single stabilizer friction strip. The two primary friction strips may be located on opposite sides of the single stabilizer friction strip. In some embodiments, the stand includes a plurality of stabilizer friction strips and a single primary friction strip. A plurality of stabilizers may be connected to the plurality of stabilizer friction strips. In some embodiments, the stand includes any number of primary friction strips and any number of stabilizer friction strips.

In at least one embodiment, the lower member of the stabilizer is connected to the base hinge. The lower member may therefore be rotationally independent of both the base and the stand. For example, the rotational position of the lower member may be unaffected by any rotation of the base with respect to the stand or the stand with respect to the base. In some embodiments, the lower member is rotationally connected to the stand. In some embodiments, the lower member is rotationally connected to the base.

In some embodiments, a stabilizer may include an upper member and a lower member. The upper member may be connected to the lower member at a stabilizer connection. The stabilizer connection may be a rotational connection, meaning that the upper member may be rotatable relative to the lower member. A stabilizer connector may be rotationally connected to the upper member and the lower member at the stabilizer connection. For example, the stabilizer connector may rotate independently of the upper member and the lower member. In some embodiments, the stabilizer connection includes a pin extending through the upper member, the lower member and the stabilizer connector.

The stabilizer connector may be configured to connect to a display stabilizer receiver or a base stabilizer receiver. The stabilizer connector may include a stabilizer magnet. The display stabilizer receiver and/or the base stabilizer receiver (collectively, stabilizer receivers) may include a receiver magnet (not shown). The stabilizer magnet may have a first polarity, and the receiver magnet may have a second polarity, the second polarity being opposite the first polarity. Therefore, the stabilizer magnet may be magnetically attracted to the receiver magnet. Thus, the stabilizer connector may be a magnetic connector. A magnetic stabilizer connector may allow the stabilizer to easily connect to and disconnect from a display or a base. This may make it easy or convenient to change between configurations of a computing device.

The stabilizer connector may have a different rotational angle depending on whether it is connected to the base or the display. Thus, when changing from connecting to the base to the display, or from the display to the base, the stabilizer connector may need to be rotated so that it may properly connect to the display or to the base.

In some embodiments, the stabilizer connector is rectangular in cross-section. Two or more of the sides of the stabilizer connector may include a magnet, such as the stabilizer magnet. For example, opposite sides of the stabilizer connector that include a stabilizer magnet may assist the stabilizer connector with connecting to the stabilizer receivers.

In some embodiments, a stabilizer magnet is located on each of the four sides of the stabilizer connector. Therefore, a stabilizer magnet will always be presented to a stabilizer receiver. In some embodiments, each side of the stabilizer connector includes a stabilizer magnet having the same polarity. Thus, each side of the stabilizer connector may connect to the stabilizer receiver.

In some embodiments, adjacent sides of the stabilizer connector include stabilizer magnets having different polarities. When a stabilizer magnet having an opposite polarity as a stabilizer receiver is presented to the stabilizer receiver, the stabilizer magnet is magnetically attracted to the stabilizer receiver. When a stabilizer magnet having the same polarity as the stabilizer receiver is presented to the stabilizer receiver, the stabilizer magnet is magnetically repulsed from the stabilizer receiver. This may cause the stabilizer connector to rotate. As the stabilizer connector is rotated, a stabilizer magnet having the opposite polarity as the stabilizer receiver may be presented to the stabilizer receiver, and the stabilizer magnet may be magnetically attracted to the stabilizer receiver. Thus, by including four stabilizer magnets on the stabilizer connector, with adjacent sides of the stabilizer connector having opposing polarity, the stabilizer connector may automatically rotate to connect to the stabilizer receiver of the base or the display.

In some embodiments, the stabilizer connector has a transverse cross-section having a different shape, including circular, triangular, pentagonal, hexagonal, heptagonal, octagonal, polygonal of any number of sides, asymmetrically polygonal, non-polygonal, or any other shape. In some embodiments, the stabilizer connector includes a non-magnetic connection. In some examples, the stabilizer receiver includes an indentation or a cavity, and the stabilizer connector includes a protrusion configured to be inserted into the indentation or cavity with a friction or interference fit. In other examples, the stabilizer receiver may connect to the stabilizer connector with a snap or a button. In still other examples, the stabilizer connector includes a Velcro connection. A Velcro connection may be agnostic to the rotational angle of the stabilizer connector.

The lower member may include a primary lower member and a secondary lower member. The primary lower member and the secondary lower member may be connected with a rotatable connection. This may allow for precise placement of the stabilizer connector with respect to the stabilizer receiver, regardless of the location or relative angular orientation of the stabilizer receiver.

The primary lower member may include a base hinge connector. The base hinge connector may connect the lower member to the base hinge. The base hinge connector may include a hollow cylindrical clamp that clamps onto a pin of the base hinge. Therefore, the primary lower member may rotate about the base hinge independent of the base or the stand. The primary lower member may further include a bend between the base hinge connector and the secondary lower member. The bend may allow the primary lower member to lay flat against the base while still connected to the base hinge with the base hinge connector.

In some embodiments, in a laptop configuration, configuration the display may be parallel or approximately parallel to the stand. The stand may be rotated with a stand angle relative to the base. In some embodiments, the stand angle may be in a range having an upper value and a lower value, or upper and lower values including any of 0°, 15°, 30°, 45°, 60°, 75°, 90°, 105°, 120°, 135°, or any value therebetween. For example, the stand angle may be 0°. In other examples, the stand angle may be less than 135°. In yet other examples, the stand angle may be greater than 135°.

In some embodiments, the display may be rotated about a display hinge. The display may be connected to the stand at a stand hinge. In at least one embodiment, the stand hinge is located at the center of the display. In some embodiments, the stand hinge is located at a stand hinge position a percentage of a display distance between a display first end and a display second end. In some embodiments, the stand hinge position is in a range having an upper value and a lower value, or upper and lower values including any of 10%, 20%, 25%, 30%, 33%, 40%, 50%, 60%, 66%, 70%, 75%, 80%, 90%, or any value therebetween of the display distance. For example, the stand hinge position may greater than 10% of the display distance. In other examples, the stand hinge position is less than 90% of the display distance. In yet other examples, the stand hinge position may be any value in a range between 10% and 90% of the display distance. In still other examples, the stand hinge is located at the display first end or the display second end. The stand hinge position may change the amount that the display overlaps the base for a given stand angle. This may allow a user to increase or decrease a footprint of the computing device in the studio configuration.

The display may be rotated with respect to the stand with a display hinge angle. In some embodiments, the display hinge angle is in a range having an upper value and a lower value, or upper and lower values including any of 0°, 15°, 30°, 45°, 60°, 75°, 90°, 105°, 120°, 135°, or any value therebetween. For example, the display hinge angle may be 0° (e.g., the display may be parallel to the stand). In other examples, the display hinge angle is less than 135°. By changing the display hinge angle while keeping the stand angle the same, the display first end may be moved toward a base first end, and the display first end may overhang at least a portion of the base.

As the display is rotated with respect to the stand, the one or more primary supports may slide along a primary friction strip on the stand. The upper member of the stabilizer may slide along a stabilizer friction strip on the stand. The friction of the primary supports and/or the upper member may have a combined display hinge coefficient of friction that requires a display hinge friction force to overcome. In at least one embodiment, the display is prevented from rotated about the display hinge upon application of a display torque. For example, the display hinge may withstand the display torque while maintaining the display hinge angle. Applying the display torque to the display may apply the display hinge friction force to the display hinge, thereby rotating the display. In some embodiments, the display torque is in a range having an upper value and a lower value, or upper and lower values including any of 0.25 N m, 0.5 N m, 0.75 N m, 1.0 N m, 1.25 N m, 1.5 N m, 1.75 N m, 2.0 N m, or any value therebetween. For example, the display torque may greater than 0.25 N m. In other examples, the display torque is less than 2.0 N m. In yet other examples, the display torque is any value in a range between 0.25 N m and 2.0 N m.

In the embodiment shown, a clockwise display torque rotates the display first end away from the stand. This may cause the primary supports to slide up the stand along the primary friction strips. When the stabilizer connector is connected to the display, a clockwise display torque may cause the upper member to slide down the stand along the stabilizer friction strip. When the stabilizer connector is connected to the display, the display torque required to rotate the display may be increased because of the sliding of the upper member along the stabilizer friction strip.

As the display hinge angle increases, the stabilizer connector may be disconnected from the display. In this manner, in at least one position or configuration, the stabilizer may not be connected to the display or the base. As the stand is rotated toward the base, thereby decreasing the stand angle, the stabilizer connector may connect to the base, which may place the computing device into a studio mode.

The display may be oriented with respect to the base with a display angle. The display angle may be the angle between an extension of the display by the reference line and the base. The display angle may be the angle at which a user interacts with or engages the computing device. In some embodiments, the display angle is in a range having an upper value and a lower value, or upper and lower values including any of 0°, 15°, 30°, 45°, 60°, 75°, 90°, 105°, 120°, 135°, 150°, 165°, 180° or any value therebetween. For example, the display angle may be 0° (e.g., the display may be parallel to the base). In other examples, the display angle is between 0° and 90°. In still other examples, the display angle is between 0° and 30°.

The base, the stand, and the display, extended by a reference line to the base, may form a triangle. The three angles of the triangle may include the stand angle, the display hinge angle, and the display angle. As discussed above, the stand angle may be adjusted by rotating the stand with respect to the base, which may cause the upper member to slide along the stabilizer friction strip on the stand. The display hinge angle may be adjusted by rotating the display with respect to the stand, which may cause the primary support to slide along the primary friction strip on the stand. Because a triangle must always include 180°, the display angle may be determined by subtracting the display hinge angle and the stand angle from 180°. Therefore, by rotating the stand with respect to the base and the display with respect to the stand, the display angle, and therefore the orientation of the display, may be optimized by a user based on his or her preferences.

For example, the user may change the display angle based on visual preferences, such as to reduce glare or increase visibility of the display. In other examples, the user may change the display angle based on ergonomic preferences, such as to change the angle at which the user's head is oriented with respect to the display.

In the studio mode, the display may be fully supported by the stand. For example, the display may not directly contact or touch the base. Thus, at least a portion of the display may overlap, or cover, the base. In at least one embodiment, display overlaps at least a portion of an input device on the base. For example, the input device may be a keyboard or a track pad, and the display may overlap a portion or all of the keyboard or the track pad.

The display may overlap an overlap percentage of the base. The overlap percentage may be the percentage of the base that is overlapped or covered by the display. In some embodiments, the overlap percentage is in a range having an upper value and a lower value, or upper and lower values including any of 10%, 20%, 25%, 30%, or any value therebetween. For example, the overlap percentage may greater than 10%. In other examples, the overlap percentage may be less than 30%. In yet other examples, the overlap percentage is any value in a range between 10% and 30%. In still other examples, overlap percentage is 100%, such that the display overlaps an entirety of the base.

By overlapping the base, the computing device may be used in compact situations. For example, for a given display angle, the computing device in studio mode may have a significantly smaller footprint than a laptop computer with the same or a similar display angle. This may especially be useful for a user operating the computing device in confined spaces, such as on an airplane, a train, a bus, a motor vehicle, other forms of public or private transportation, a classroom desk, a small table, and any other space.

The display first end may be located above the base with a first end height. In some embodiments, the first end height is in a range having an upper value and a lower value, or upper and lower values including any of 1 cm, 2 cm, 3 cm, 4 cm, 5 cm, 6 cm, 7 cm, 8 cm, or any value therebetween. For example, the first end height may greater than 1 cm. In other examples, the first end height is less than 8 cm. In yet other examples, the first end height is any value in a range between 1 cm and 8 cm.

The first end height may be optimized to a user's preferences by adjusting the display hinge angle, the stand angle, and the display angle. For example, the first end height may be adjusted to allow a user's hands to operate the input device underneath the display, or between the display and the base. This may further enable the user to use the computing device in compact locations. Many users are more proficient at typing on a mechanical keyboard. Indeed, a user may not need to see the keys of a mechanical keyboard to effectively type. By typing on a keyboard located on the base with her hands between the display and the base, a user may operate the computing device on a reduced footprint.

A user may wish to interact with a touch-sensitive display on the display. It may be difficult for the user to effectively interact with the area of the display near the display first end. For example, some users may draw on the display with an electronic pen, and the user may have to contort his hand to draw on the display near the display first end, which may result in undesirable drawings. The user may adjust the first end height sufficient to comfortably interact with the display near the display first end.

As the user interacts with the display, especially with a touch-sensitive display, the user will exert a use force on the display. This use force may exert a display torque about the second hinge. Because of a combination of friction from the stand hinge and the sliding of the primary support along the primary friction strip, the second hinge may resist rotation caused by the use force. A breakout display torque may be the torque required to begin rotating the display about the second hinge. The breakout display torque may be adjusted by adjusting the friction of the primary support along the friction strip. The breakout display torque may be balanced with the use force, such that the use force may not rotate the display, until the use force reaches the breakout display torque. The breakout torque may be optimized so that it is not so low that a normal use force may unintentionally rotate the display, but not so high that a user has difficulty rotating the display.

A least a portion of the use force may be transferred from the display to the stand. The stabilizer may transfer at least part of the portion of the use force to the base. This may help reduce rotation of the stand as a result of the use force. This in turn, may help to provide a stable platform against which the user may operate the computing device.

In some embodiments, a stand may be rotated clockwise with respect to the base. This may pull the stabilizer connector toward the stand. This may cause the secondary lower member to pull toward the stand, and to rotate counterclockwise relative to the primary lower member. Moving the stabilizer toward the stand may further cause the upper member to slide down the stabilizer friction strip on the stand.

The stand may be rotated further clockwise with respect to the base. This may cause the stabilizer connector to disconnect from the base stabilizer receiver. In at least one embodiment, the display rotates (clockwise or counterclockwise) with respect to the stand while the stand is rotating counterclockwise.

After the stabilizer connector has been disconnected from the base, the lower member may move toward the stand. In some embodiments, the lower member is moved toward the stand manually by a user. In some embodiments, the lower member is urged toward the stand using a spring in the lower member. In some embodiments, the lower member is urged toward the stand using a pair of magnets.

The display may be rotated clockwise with respect to the stand until the stabilizer connector has connected to a display connector receiver. The lower member may be flush with or pressed against the stand, and the stand may be rotated until it is parallel with the stand. In this manner, the computing device may move between the studio configuration and the laptop configuration.

In some embodiments, a method for operating a hinge includes rotating a display into a first position. Rotating the display into the first position may include rotating a stand connected to the display into a stand first position, the display being parallel to the stand. The display first position may be relative to a base. Rotating the display into the second position may include rotating the display from the first position to the second position.

The method further includes rotating the display into a second position. The display may be rotated about the stand with a display hinge. The display may rotate about the stand at a stand first end. The stand may be connected to the base at a stand second end with a base hinge. Rotating the display into the second position may include disconnecting a stabilizer from the display and connecting the stabilizer to the base. In at least one embodiment, rotating the display to the first position includes rotating the display from the second position to the first position.

The method optionally includes sliding a primary support along a friction strip on the stand. The primary support may be connected to the display at a fixed, rotatable connection. The primary support may be magnetically connected to the friction strip such that a friction force is required to slide the primary support along the friction strip. The primary support may be slid along the friction strip as the display is rotated to the second position. For example, rotating the display to the second position may include sliding the primary support along the friction strip. In at least one embodiment, rotating the display to the first position includes disconnecting the stabilizer from the base and connecting the stabilizer to the display.

Following are sections of devices and methods of embodiments of the present disclosure:

1) A computing device, comprising:
  a first hinge (116) rotatably connecting a stand (104) to a base (102), the first hinge having a first coefficient of friction sufficient to maintain a first angular position between the stand and the base; and
  a second hinge (112) rotatably connecting the stand to a display (106), the second hinge having a second coefficient of friction sufficient to maintain a second angular position between the display and the stand.

2) The computing device of section 1, wherein the computing device includes a first configuration in which the display is parallel or approximately parallel to the stand.

3) The computing device of section 1 or section, wherein the computing device includes a second configuration in which the display is non-parallel to the stand.

4) The computing device of section 3, wherein in the second configuration, the display overlaps at least 50% of the base.

5) The computing device of section 3 or section 4, wherein in the second configuration, the display does not contact the base.

6) The computing device of any of sections 3-5, wherein in the second configuration, the display overlaps an input device (103) on the base.

7) The computing device of any of sections 3-6, wherein in the second configuration, the display can withstand a display torque of 1.0 N m while maintaining the second angular position.

8) The computing device of any of sections 1-7, wherein the second angular position is between 0° and 180°.

9) A hinge, comprising:
  a primary support (118) including a primary support first end and a primary support second end, the primary support first end being rotationally connected to a display (106) and the primary support second end being slidably connected to a stand (104);
  a stabilizer (122), wherein the stabilizer is connected to the display in a first configuration and the stabilizer is connected to a base (102) in a second configuration.

10) The hinge of section 9, the stabilizer including:
  an upper member (124) having an upper member first end and an upper member second end;
  a lower member (126);
  a stabilizer connector (128), the upper member first end and the lower member being connected to the stabilizer connector.

11) The computing device of section 9 or section 10, wherein, in the first configuration, the stabilizer is connected to the display with the stabilizer connector.

12) The computing device of any of sections 9-11, wherein, in the second configuration, the stabilizer is connected to the base with the stabilizer connector.

13) The computing device of any of sections 9-12, wherein the stabilizer connector is magnetic.

14) The computing device of any of sections 9-13, wherein the upper member second end is connected to the stand at a stabilizer friction strip (530).

15) The computing device of section 14, wherein the upper member includes an upper member magnet (554), and the stabilizer friction strip is magnetic, the upper member magnet being magnetically attracted to the stabilizer friction strip.

16) The computing device of any of sections 9-15, wherein the lower member is connected to the base at a base hinge (114).

17) A method of operating a hinge, comprising:
  rotating a display (106) into a first position;
  rotating the display into a second position with a display hinge (112), wherein rotating the display into the second position includes rotating the display about a stand (104); and
  sliding a primary support along a friction strip (530) on the stand.

18) The method of section 17, wherein rotating the display into the second position includes:
  disconnecting a stabilizer (122) from the display; and
  connecting the stabilizer to a base (102).

19) The method of section 17 or section 18, wherein rotating the display into the second position includes rotating the display from the first position to the second position.

20) The method of any of sections 17-19, wherein, as the display is rotated to the second position, the primary support is slid along the friction strip.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computing device, comprising:
- a first hinge rotatably connecting a stand to a base, the first hinge having a first coefficient of friction sufficient to maintain a first angular position between the stand and the base; and
- a second hinge rotatably connecting the stand to a display, the second hinge having a second coefficient of friction sufficient to maintain a second angular position between the display and the stand;
- a primary support including a primary support first end rotationally connected to the display and a primary support second end being slidably connected to the stand;
- a stabilizer, including:
  - an upper member having an upper member first end slidably connected to the stand and an upper member second end;
  - a lower member; and
  - a stabilizer connector, the upper member second end and the lower member being connected to the stabilizer connector, and wherein the stabilizer connector is releasably connected to the display in a first configuration and the stabilizer connector releasably connected to the base in a second configuration wherein the first configuration is different from the second configuration.

2. The computing device of claim 1, wherein the computing device includes the first configuration in which the display is parallel or approximately parallel to the stand.

3. The computing device of claim 1, wherein the computing device includes the second configuration in which the display is non-parallel to the stand.

4. The computing device of claim 3, wherein in the second configuration, the display overlaps at least 50% of the base.

5. The computing device of claim 3, wherein in the second configuration, the display does not contact the base.

6. The computing device of claim 3, wherein in the second configuration, the display overlaps an input device on the base.

7. The computing device of claim 3, wherein in the second configuration, the display can withstand a display torque of 1.0 N m while maintaining the second angular position.

8. The computing device of claim 1, wherein the second angular position is between 0° and 180°.

9. A method of manipulating the computing device of claim 1, comprising:
- rotating the display into a first position;
- rotating the display into a second position with the second hinge, wherein rotating the display into the second position includes rotating the display about the stand; and
- sliding the primary support along a friction strip on the stand.

10. The method of claim 9, wherein rotating the display into the second position includes:
- disconnecting the stabilizer from the display; and
- connecting the stabilizer to the base.

11. The method of claim 9, wherein rotating the display into the second position includes rotating the display from the first position to the second position.

12. The method of claim 9, wherein, as the display is rotated to the second position, the primary support is slid along the friction strip.

13. A hinge, comprising:
- a primary support including a primary support first end and a primary support second end, the primary support second end being slidably connected to a stand via a first slidable connection at a primary friction strip; and
- a stabilizer including:
  - an upper member having an upper member first end and an upper member second end, wherein the upper member second end is slidably connected to the stand via a second slidable connection, different from the first slidable connection, at a stabilizer friction strip, wherein the first slidable connection is slidable along the stand at the primary friction strip independent of the second slidable connection;
  - a lower member having a lower member first end and a lower member second end, wherein the lower member second end is rotatably connected to the stand; and
  - a stabilizer connector, the upper member first end and the lower member first end being connected to the stabilizer connector.

14. The hinge of claim 13, wherein, in a first configuration, the stabilizer is connected to a display with the stabilizer connector, and in a second configuration, the stabilizer is connected to a base with the stabilizer connector and the stabilizer connector is not connected to the display.

15. The hinge of claim 13, wherein the stabilizer connector is magnetic.

16. The hinge of claim 13, wherein the upper member includes an upper member magnet, and the stabilizer friction strip is magnetic, the upper member magnet being magnetically attracted to the stabilizer friction strip.

17. The hinge of claim 13, wherein the lower member is connected to a base at a base hinge.

18. The hinge of claim 13, wherein the stabilizer connector is releasably connected to one or more of (a) a display in a first configuration or (b) a base in a second configuration.

* * * * *